United States Patent
Moon et al.

(10) Patent No.: US 10,762,262 B1
(45) Date of Patent: Sep. 1, 2020

(54) MULTI-DIMENSIONAL CONSTRAINT SOLVER USING MODIFIED RELAXATION PROCESS

(71) Applicant: Synopsys, Inc., Mountain View, CA (US)

(72) Inventors: In Ho Moon, Portland, OR (US); Qiang Qiang, Santa Clara, CA (US); Dhiraj Goswami, Wilsonville, OR (US)

(73) Assignee: Synopsys, Inc., Mountain View, CA (US)

( * ) Notice: Subject to any disclaimer, the term of this patent is extended or adjusted under 35 U.S.C. 154(b) by 153 days.

(21) Appl. No.: 16/151,303

(22) Filed: Oct. 3, 2018

Related U.S. Application Data

(60) Provisional application No. 62/581,251, filed on Nov. 3, 2017.

(51) Int. Cl.
*G06F 17/50* (2006.01)
*G06F 30/33* (2020.01)
(Continued)

(52) U.S. Cl.
CPC ......... *G06F 30/33* (2020.01); *G06F 2111/04* (2020.01); *G06F 2111/20* (2020.01)

(58) Field of Classification Search
CPC ..................................................... G06F 30/33
(Continued)

(56) References Cited

U.S. PATENT DOCUMENTS 5,469,367 A  11/1995  Puri et al.
5,717,699 A * 2/1998  Haag ............... G01R 31/31851
                                                    714/725
(Continued)

OTHER PUBLICATIONS

Aloul, Fadi A., et al. "PBS: A Backtrack-Search Pseudo-Boolean Solver and Optimizer", Dept. of Electrical Engineering and Computer Science Univ. of Michigan, Fifth Int'l. Symposium on Theory and Applications of Satisfiability Testing, May 6-9, 2000, 9 pages.

(Continued)

*Primary Examiner* — Suchin Parihar
(74) *Attorney, Agent, or Firm* — Bever, Hoffman & Harms, LLP

(57) ABSTRACT

A constraint solver utilizes a modified relaxation process to generate multiple different stimulus stream arrays that comply with multi-dimensional (e.g., 2D or 3D) constraints. First, an array is generated including rows and columns of randomly generated test vector values. During a first revision phase, the array is modified to comply with first-dimension constraints (e.g., selected test vector values are changed in non-compliant rows until every row complies with all row constraints). A second revision phase is then performed in multiple cycles, where each cycle includes identifying a current element having a greatest impact on non-compliance of the array on second-dimension (e.g., column and/or diagonal) constraints, and revising the current element's test vector value in a way that both minimizes the non-compliance, and also maintains compliance of the array with the first-dimension constraints. The second revision phase repeats until the array converges on a solution that complies with all multi-dimensional constraints.

20 Claims, 19 Drawing Sheets

(51) Int. Cl.
*G06F 111/04* (2020.01)
*G06F 111/20* (2020.01)

(58) Field of Classification Search
USPC ........................................................ 716/102
See application file for complete search history.

(56) References Cited

U.S. PATENT DOCUMENTS

| | | | | |
|---|---|---|---|---|
| 6,080,203 | A * | 6/2000 | Njinda | G01R 31/318591 703/14 |
| 6,631,470 | B2 * | 10/2003 | Chang | G06F 30/30 716/103 |
| 6,701,474 | B2 * | 3/2004 | Cooke | G06F 30/30 714/724 |
| 2002/0091979 | A1 * | 7/2002 | Cooke | G01R 31/31834 714/733 |
| 2003/0046671 | A1 * | 3/2003 | Bowen | G06F 30/30 717/141 |
| 2005/0193280 | A1 * | 9/2005 | Schubert | G01R 31/31704 714/47.1 |
| 2010/0305933 | A1 * | 12/2010 | Chang | G06F 30/331 703/15 |
| 2017/0076116 | A1 * | 3/2017 | Chen | G06N 20/00 |

OTHER PUBLICATIONS

Aloul, Fadi A., et al. "PBS: A Backtrack-Search Pseudo-Boolean Solver and Optimizer", Dept. of Electrical Engineering and Computer Science Univ. of Michigan, Submitted to; SAT '2002, 8 pages.
Aloul, Fadi A., et al., "Generic ILP versus Specialized 0-1 ILP: An Update", Dept. of Electrical Engineering and Computer Science Univ. of Michigan, Accepted to ICCAD 2008, 8 pages.
Gu, Jun, et al., "Algorithms for the Satisfiability (SAT) Problem: A Survey", DIMACS Series in Discrete Mathematics and Theoretical Computer Science, vol. 00, 19xx, 132 oages.

* cited by examiner

200 →

201 — Array[row][col]; // Establishes 2 dimensional Array
NumRow; // Array set with [row]
NumCols; // Array set with [col]
202 — Vmin ; // Minimum valid test vector value
Vmax; // Maximum valid test vector value
203 — RowSumMin; // Minimum valid sum value of each row
RowSumMax; // Maximum valid sum value of each row
RowSum[row]; // Current sum of each row
204 — ColSumMin; // Minimum valid sum value of each column
ColSumMax; // Maximum valid sum value of each column
ColSum[col]; // Current sum of each column
205 — DSumMin; // Minimum valid sum value of each diagonal
DSumMax; // Maximum valid sum value of each diagonal
206 — DSum[dia]; // Current sum of each diagonal
207 — Vfixed[row][col]; // fixed value of corresponding element
MaxFails; // Maximum failures allowed to abort

FIG. 2

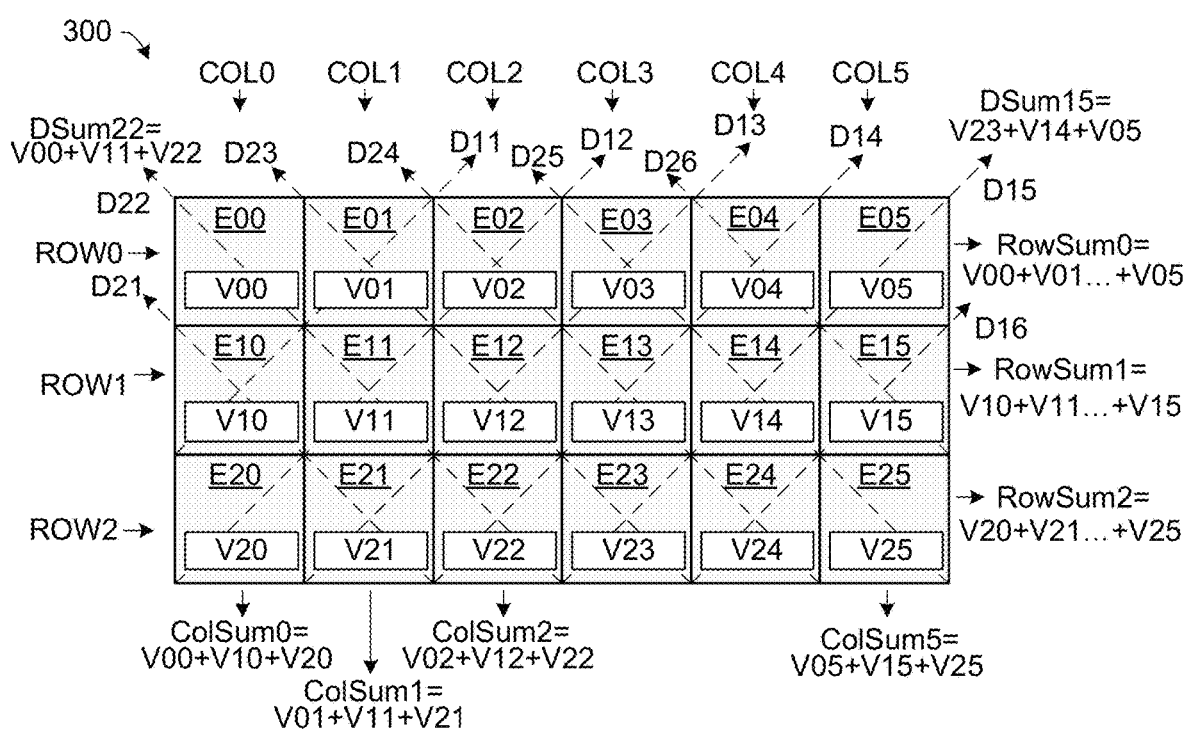

CURRENT ROW = ROW0

| E00 | E01 | E02 | E03 | E04 | E05 |
|---|---|---|---|---|---|
| V00=0 | V01=1 | V02=2 | V03=3 | V04=4 | V05=5 |

RowSumMIN(16) < RowSum0(15) < RowSumMAX(30) → NO

FIG. 6B

DSum21=10

| E00 | E01 | E02 | E03 | E04 | E05 |
|---|---|---|---|---|---|
| V00=1 | V01=1 | V02=2 | V03=3 | V04=4 | V05=5 |
| E10 | E11 | | | | |
| V10=2 | V11=3 | | | | |
| E20 | | E22 | | | |
| V20=4 | | V22=6 | | | |

RowSum0 =16

ColSum0=7

FIG. 6C

| E00 | E01 | E02 | E03 | E04 | E05 |
|---|---|---|---|---|---|
| V00=1 | V01=1 | V02=2 | V03=3 | V04=4 | V05=5 |

RowSumMIN(16) < RowSum0(16) < RowSumMAX(30) → YES

FIG. 7

CURRENT ROW = ROW1

| E10 | E11 | E12 | E13 | E14 | E15 |
|---|---|---|---|---|---|
| V10=2 | V11=3 | V12=4 | V13=5 | V14=6 | V15=7 |

RowSumMIN(16) < RowSum1(27) < RowSumMAX(30) → YES

FIG. 8A

CURRENT ROW = ROW2

| E20 | E21 | E22 | E23 | E24 | E25 |
|---|---|---|---|---|---|
| V20=4 | V21=5 | V22=6 | V23=7 | V24=8 | V25=9 |

RowSumMIN(16) < RowSum2(39) < RowSumMAX(30) →NO

FIG. 8B

DSum24=7

| E02 | | E04 |
|---|---|---|
| V02=2 | | V04=4 |

DSum16=7

| | E13 | E14 | E15 |
|---|---|---|---|
| | V13=5 | V14=6 | V15=7 |

| E20 | E21 | E22 | E23 | E24 | E25 |
|---|---|---|---|---|---|
| V20=4 | V21=5 | V22=6 | V23=7 | V24=0 | V25=9 |

→ RowSum2 =31

ColSum4=10

FIG. 8C

| E20 | E21 | E22 | E23 | E24 | E25 |
|---|---|---|---|---|---|
| V20=4 | V21=5 | V22=6 | V23=7 | V24=0 | V25=9 |

RowSumMIN(16) < RowSum1(31) < RowSumMAX(30) →NO

FIG. 8D

DSum25=7

| E03 | | E05 |
|---|---|---|
| V03=2 | | V05=5 |

| | E14 | E15 |
|---|---|---|
| | V14=6 | V15=7 |

| E20 | E21 | E22 | E23 | E24 | E25 |
|---|---|---|---|---|---|
| V20=4 | V21=5 | V22=6 | V23=7 | V24=0 | V25=8 |

→ RowSum2 =30

ColSum5 = 20

FIG. 8E

| E20 | E21 | E22 | E23 | E24 | E25 |
|---|---|---|---|---|---|
| V20=4 | V21=5 | V22=6 | V23=7 | V24=0 | V25=8 |

RowSumMIN(16) < RowSum2(30) < RowSumMAX(30) →YES

NON-COMPLIANT COLUMNS
COMPLIANT COLUMNS

| COL0 | COL1 | COL2 | COL3 | COL4 | COL5 |
|---|---|---|---|---|---|
| E00<br>V00=1<br>N00=1 | E01<br>V01=1<br>N01=0 | E02<br>V02=2<br>N02=0 | E03<br>V03=3<br>N03=0 | E04<br>V04=4<br>N04=0 | E05<br>V05=5<br>N05=4 |
| E10<br>V10=2<br>N10=1 | E11<br>V11=3<br>N11=0 | E12<br>V12=4<br>N12=0 | E13<br>V13=5<br>N13=0 | E14<br>V14=6<br>N14=0 | E15<br>V15=7<br>N15=4 |
| E20<br>V20=4<br>N20=1 | E21<br>V21=5<br>N21=0 | E22<br>V22=6<br>N22=0 | E23<br>V23=7<br>N23=0 | E24<br>V24=0<br>N24=0 | E25<br>V25=8<br>N25=4 |

ColSum0=7, ColSum1=9, ColSum2=12, ColSum3=15, ColSum4=10, ColSum5=20

FIG. 11A

COL5: E05 (V05=5), E15 (V15=7)

ROW2:
| E20 | E21 | E22 | E23 | E24 | E25 |
|---|---|---|---|---|---|
| V20=4<br>[-1] | V21=5<br>[0] | V22=6<br>[0] | V23=7<br>[+1] | V24=0<br>[0] | V25=8<br>M25=4 |

RowSum2=30, ColSum5=20

FIG. 11B

COL5: E05 (V05=5), E15 (V15=7)

ROW2:
| E20 | E21 | E22 | E23 | E24 | E25 |
|---|---|---|---|---|---|
| V20=8 | V21=5 | V22=6 | V23=7 | V24=0 | V25=4 |

RowSum2=30, ColSum5=16

FIG. 11C

COL5 →

ROW2 →

| E20 | E21 | E22 | E23 | E24 | E25 |
|---|---|---|---|---|---|
| V20=4 | V21=5 | V22=6 | V23=7 | V24=4 | V25=4 |

E05 / V05=5
E15 / V15=7

ColSum5=16
RowSum2=30

COL5 →

ROWSLACK2
= RowSum2 − RowSumMIN
= 30−16 = 14

ROW2 →

| E20 | E21 | E22 | E23 | E24 | E25 |
|---|---|---|---|---|---|
| V20=4 | V21=5 | V22=6 | V23=7 | V24=0 | V25=8 / M25=4 |

E05 / V05=5
E15 / V15=7

ColSum5=20
RowSum2=30

COL5 →

ROW2 →

| E20 | E21 | E22 | E23 | E24 | E25 |
|---|---|---|---|---|---|
| V20=4 | V21=5 | V22=6 | V23=7 | V24=0 | V25=4 |

E05 / V05=5
E15 / V15=7

ColSum5=16
RowSum2=26

NON-COMPLIANT COLUMN

COMPLIANT COLUMNS

| COL0 | COL1 | COL2 | COL3 | COL4 | COL5 |
|---|---|---|---|---|---|
| E00<br>V00=1<br>N00=1 | E01<br>V01=1<br>N01=0 | E02<br>V02=2<br>N02=0 | E03<br>V03=3<br>N03=0 | E04<br>V04=4<br>N04=0 | E05<br>V05=5<br>N05=0 |
| E10<br>V10=2<br>N10=1 | E11<br>V11=3<br>N11=0 | E12<br>V12=4<br>N12=0 | E13<br>V13=5<br>N13=0 | E14<br>V14=6<br>N14=0 | E15<br>V15=7<br>N15=0 |
| E20<br>V20=4<br>N20=1 | E21<br>V21=5<br>N21=0 | E22<br>V22=6<br>N22=0 | E23<br>V23=7<br>N23=0 | E24<br>V24=0<br>N24=0 | E25<br>V25=4<br>N25=0 |

ColSum0=7  ColSum1=9  ColSum2=12  ColSum3=15  ColSum4=10  ColSum5=16

FIG. 14A

| E00<br>V00=1<br>M00=1 | E01<br>V01=1 | E02<br>V02=2 | E03<br>V03=3 | E04<br>V04=4 | E05<br>V05=5 | → RowSum0<br>=16 |
| E10<br>V10=2 | | | | | | ← ROW0 |
| E20<br>V20=4 | | | | | | |

↖ COL0
↓ ColSum0=7

ROWSLACK0
= RowSumMAX − RowSum0
= 30−16 = 14

FIG. 14B

| E00<br>V00=2 | E01<br>V01=1 | E02<br>V02=3 | E03<br>V03=3 | E04<br>V04=4 | E05<br>V05=5 | → RowSum0<br>=17 |
| E10<br>V10=2 | | | | | | ← ROW0 |
| E20<br>V20=4 | | | | | | |

↖ COL0
↓ ColSum0=8

300A4

COL4  DSum14=15

| E00 | E01 | E02 | E03 | E04 | E05 |
|---|---|---|---|---|---|
| V00=2 N00=0 | V01=1 N01=0 | V02=2 N02=0 | V03=3 N03=0 | V04=4 N04=1 | V05=5 N05=0 |
| E10 | E11 | E12 | E13 | E14 | E15 |
| V10=6 N10=0 | V11=3 N11=0 | V12=4 N12=0 | V13=5 N13=1 | V14=2 N14=2 | V15=5 N15=0 |
| E20 | E21 | E22 | E23 | E24 | E25 |
| V20=4 N20=0 | V21=5 N21=0 | V22=6 N22=1 | V23=7 N23=0 | V24=0 N24=2 | V25=6 N25=0 |

ColSum0=12  ColSum1=9  ColSum2=12  ColSum3=15  ColSum4=6  ColSum5=16

FIG. 17

ROW2

FIG. 18A

| E20 | E21 | E22 | E23 | E24 | E25 |
|---|---|---|---|---|---|
| V20=4 [+1] | V21=5 [+1] | V22=6 [0] | V23=7 0] | V24=0 M24=2 | V25=6 [0] |

COL4

| E04 |
|---|
| V04=4 |

| E14 |
|---|
| V24=2 |

ROW2

FIG. 18B

| E20 | E21 | E22 | E23 | E24 | E25 |
|---|---|---|---|---|---|
| V20=4 | V21=5 | V22=6 | V23=7 | V24=2 | V25=4 |

ColSum4=8

300A5

DSum14=15

| E00 | E01 | E02 | E03 | E04 | E05 |
|---|---|---|---|---|---|
| V00=2 | V01=1 | V02=2 | V03=3 | V04=4 | V05=5 |
| N00=0 | N01=0 | N02=0 | N03=0 | N04=1 | N05=0 |
| E10 | E11 | E12 | E13 | E14 | E15 |
| V10=6 | V11=3 | V12=4 | V13=5 | V14=2 | V15=5 |
| N10=0 | N11=0 | N12=0 | N13=1 | N14=0 | N15=0 |
| E20 | E21 | E22 | E23 | E24 | E25 |
| V20=4 | V21=5 | V22=6 | V23=7 | V24=2 | V25=4 |
| N20=0 | N21=0 | N22=1 | N23=0 | N24=0 | N25=0 |

| E20 | E21 | E22 | E23 | E24 | E25 |
|---|---|---|---|---|---|
| V20=4 | V21=5 | V22=6 | V23=7 | V24=0 | V25=4 |
|  |  | M22=1 |  |  |  |

⌐ --→ ROWSLACK2 = RowSumMAX − RowSum2 = 30−26 = 2

DSum14=14

| | | | | E04 | |
|---|---|---|---|---|---|
| | | | | V04=4 | |
| | | | | N04=1 | |
| | | | E13 | | |
| | | | V13=5 | | |
| | | | N13=1 | | |
| E20 | E21 | E22 | E23 | E24 | E25 |
| V20=4 | V21=5 | V22=5 | V23=7 | V24=0 | V25=4 |

FIG. 20B

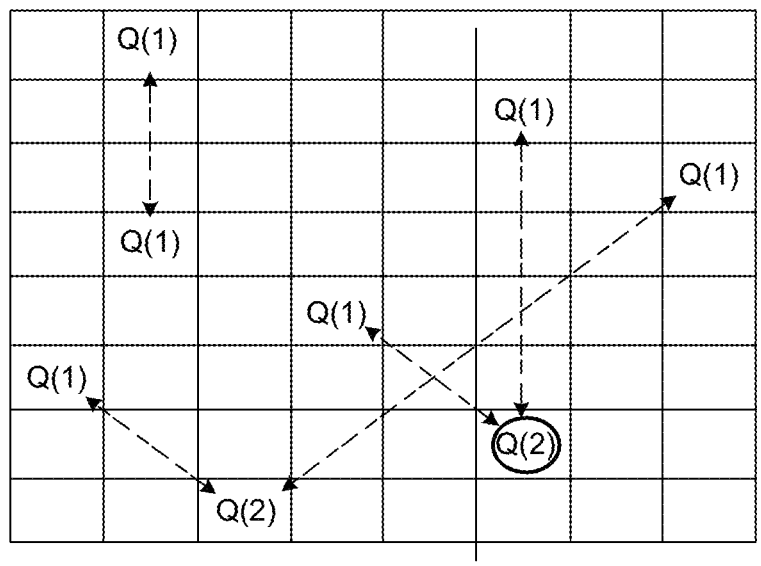
FIG. 23
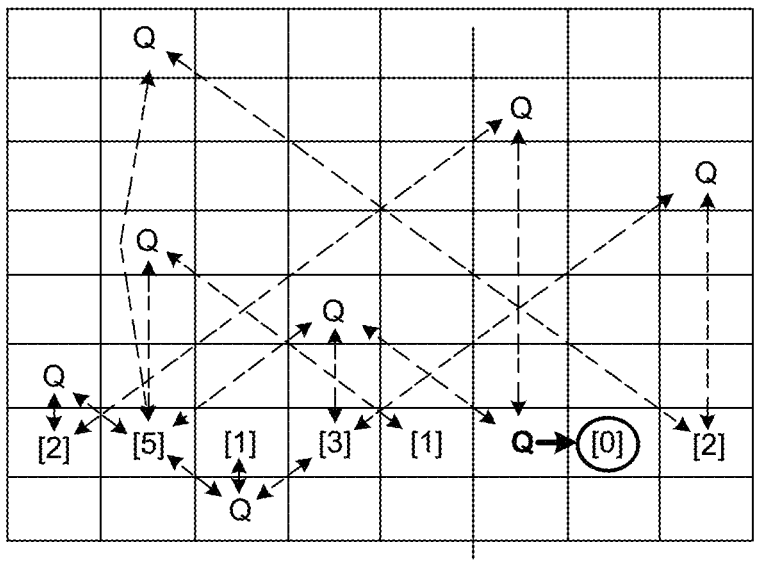
FIG. 24
| Problem | Dimension | Size | PA | Invention (seconds) |
|---|---|---|---|---|
| HiSilicon | 2D | R=6, C=43 | Timeout | 0.00001 |
| Summation | 2D | R=10, C=2880 | Mem-out | 0.026 |
| N Queens | 3D | N=100 | Timeout | 0.005 |
| N Queens | 3D | N=1000 | Timeout | 1.71 |
FIG. 25

MULTI-DIMENSIONAL CONSTRAINT SOLVER USING MODIFIED RELAXATION PROCESS

RELATED APPLICATIONS

This application claims priority from U.S. Provisional Patent Application 62/581,251, entitled "Solving Relaxation Constraints on Multi-Dimensional Array", which was filed on Nov. 3, 2017, and is incorporated by reference herein.

FIELD OF THE INVENTION

The present disclosure generally relates to electronic circuits, and more specifically to verification processes utilized to verify properties of electronic circuit designs prior to manufacture.

BACKGROUND OF THE INVENTION

As circuits have become more complex, electronic design automation (EDA) software tools have been developed to facilitate designing, testing and modifying circuit designs in preparation for manufacturing (i.e., fabricating or otherwise producing) physical circuit structures that are based on final versions of the circuit designs. As used herein, the term "circuit" generally refers to integrated circuits (ICs), printed circuit boards (PCBs), and other types of electronic device at a system level, sub-system level, or even at a transistor level. EDA software tools typically include resources (e.g., standard-cell libraries) and design assembly software that allow circuit designers to efficiently arrange and interconnect the various functional sections (blocks) of their circuit designs in the form of software-based circuit descriptions, various testing resources that allow the circuit designers to test and modify their circuit designs during development, and various conversion tools that facilitate subsequent fabrication of physical circuits based on the final circuit designs. Because modern circuits (e.g., System-on-Chip devices) can include billions of transistors and other circuit elements, EDA tools have become essential in the development and testing of modern circuit designs. That is, without EDA software tools, generating a modern circuit from concept to physical circuit using manual design techniques would be virtually impossible.

Testing functions performed by EDA software tools typically include simulation-type functional verification (simulation), which allows circuit designers to simulate operation of their circuit designs in order to verify that the circuit design will function as intended. FIG. 28 is a block diagram showing portions of a greatly simplified EDA software tool 50 that are utilized to perform simulation on a circuit design 60, which is either generated using other portions (not shown) of EDA software tool 50, or transferred to EDA software tool 50 from another EDA software tool. As indicated in FIG. 28, simulation is typically performed using software tools known in the art as a test-bench (aka, "testbench") 70 and a simulator 80, which are controlled during simulation by way of well-known user input/output interface devices 40. Test-bench 70 typically includes a stimulus (test) generator 72 that generates stimulus streams 73 in accordance with user-supplied test parameters (e.g., using a constraint solver), and a data analyzer 75 configured to collect and analyze response data transmitted from simulator 80. Simulator 80 is configured to store and emulate a circuit design model 65, which is a version of circuit design 60 that has been written in (or translated into) a specified software language understood by simulator 80, such as Verilog, VHDL or Spice. During simulation, simulator 80 receives the input stimulus streams 73 from stimulus generator 72, applies each input stimulus stream 73 to circuit design model 65 using known techniques, and outputs response data 74 indicating performance of circuit design model 65 in response to the applied stimulus stream 73. Data analyzer 75 receives response data 74 and, for example, compares the received response data with user-supplied expected response data, and generates a verification test result report 77 that is transmitted in a operable form to a user (e.g., the circuit designers tasked to develop circuit design 60) by way of I/O interface 40. In combination, test-bench 70 and simulator 80 provide EDA tool 50 with a versatile tool for functionally verifying the operation of circuit designs in a manner that allows circuit designers (users) to identify and correct flaws (bugs) in their circuit designs (e.g., circuit design 60) before incurring the significant expense of manufacturing physical circuits based on their circuit designs.

FIG. 29 is a diagram depicting an exemplary simplified stimulus stream 73 utilized during the exemplary simulation process depicted in FIG. 28. As mentioned above, stimulus stream 73 is made up of twelve test vector values V00 to V32 that are transmitted to corresponding nodes of circuit design model 65. During the generation of stimulus stream 73 by stimulus generator 72, test vector values V00 to V32 are often formatted in an array (matrix), which may be visually depicted by way arranging the test vector values in horizontal rows and vertical columns. As known in the art, this matrix arrangement facilitates the generation of stimulus streams that address various issues such as symmetry. That is, generating test vector values V00 to V32 using a matrix arrangement provides an effective mechanism for dealing with symmetry by way of applying one or more constraints to each row of test vector values, each column or test vector values, and/or each diagonal series of test vector values in the manner described below. Note that the array depicted in FIG. 29 is greatly simplified and generalized for purposes of brevity, and that an actual stimulus stream utilized during simulation of a practical circuit design may include hundreds or thousands of test vector values arranged in any number of rows and any number of columns, and each test vector value may include any number of sub-values arranged in one or more additional dimensions.

The stimulus generators used in conventional test-benches (e.g., stimulus generator 72 shown in FIG. 28) typically utilize two different methodologies to generate input stimuli for testing circuit design models: directed test methodologies, and constrained random test methodologies.

Directed test methodologies involve the generation of predefined stimulus streams that are designed to exercise specific functionalities in a target circuit design such that the target circuit design operates in a predictable manner. That is, directed test input stimuli is configured to evoke a predictable desired response by the target circuit design, whereby the target circuit design is considered acceptable when the actual directed test response data generated by the target circuit design model matches expected (predicted) response data. A benefit of utilizing directed test methodologies is that the corresponding simulation processes are able to provide reliable positive verification results (e.g., using the example of FIG. 28, when data analyzer 75 verifies that response data 74 matches the expected response data provided by a user, thereby confirming that circuit design model 65 accurately performed the corresponding required function). However, a problem with directed tests is that comprehensive input stimuli and corresponding predicted response requires many hours of preparation by a knowledgeable engineer. Moreover, because directed test methodologies focus on a narrow range of operating conditions, they are not able to provide reliable negative verification (i.e., feedback that concentrates on the identification and elimination of inadvertent functionality bugs). That is, directed test methodologies are not able to detect possible functional errors and problems that may arise when the circuit design is subjected to untested stimuli (e.g., when the circuit is subject to operating conditions other than those simulated during the directed test).

Constrained random test methodology utilizes a constraint solver to automatically generate stimulus streams that satisfy user-specified test vector value constraints. Test vector value constraints (referred to below as "constraints") are usually specified as part of a test-bench program by knowledgeable personnel (e.g., a circuit designer/engineer), and serve to restrict one or more test vector values in a specified section of each valid stimulus stream. As used herein, the term "single-dimension constraints" generally refer to constraints that are directed to test vector values related to each other in a row dimension (referred to below as "row constraints"), a column dimension (referred to below as "column constraints"), or a diagonal-sequence dimension (referred to below as "diagonal constraints"). Referring again to FIG. 29, row constraints establish restrictions on each horizontally aligned series of test vector values in the stimulus stream array, column constraints establish restrictions on each vertically aligned series of test vector values, and diagonal constraints establish restrictions on diagonally aligned series of test vector values (referred to herein as "diagonals"). For example, a row constraint may restrict a sum of all test vector values in each row to a user-defined row-sum value, whereby stimulus stream 73 would comply with the row constraints only if a sum of the test vector values in each row (i.e., a sum of test vector values V00, V01 and V01, a sum of test vector values V10, V11 and V12, a sum of test vector values V20, V21 and V22, and a sum of test vector values V30, V31 and V32) is equal to the user-defined row-sum value. Similarly, a column constraint restricting the sum of each column to a user-defined column-sum value would require sums of the test vector values in each column (e.g., V00, V10, V20 and V30) to equal the user-defined column-sum value, and a diagonal constraint restricting the sum of each diagonal series of test vector values to a user-defined diagonal-sum value would require sums of the test vector values in each diagonal series (e.g., V20, V11 and V02) to equal the user-defined diagonal-sum value. In addition to row, column and diagonal dimensions, constraints may be placed on other dimensional aspects of a stimulus stream, such as constraints applied to a byte-value dimension (i.e., where each test vector value V00 to V32 includes a multiple-bit digital value, and one or more byte-value constraints establish restrictions on each multiple-bit digital value). As used herein, the phrase "multi-dimensional constraints" refers to a set including one or more constraints from each of two or more constraint types, such as those mentioned above.

The basic functionality of a constraint solver used for EDA software tool applications may be described by its ability to solve the following constraint satisfaction problem: given a set of user-provided global variable values that define the number and type of test vector values in each stimulus stream, and given a set of constraints that restrict interrelationships between associated test vector values in each stimulus stream, automatically generate multiple unique stimulus steams that satisfy the set of constraints. The number of test vector values in each data stream array may be determined by multiplying the number of test vector values in each row by the number of test vector values in each column. For example, in the simplified embodiment shown in FIG. 29, stimulus stream 73 includes three rows and four columns, yielding twelve test vector values. The "type" of test vector value refers to the range of different values that may be assigned to each test vector value (e.g., a binary-type test vector value may have either binary 1 or 0 values, whereas a byte-type test vector value may have 256 different values). As understood in the art, various constraint types and combinations of constraints may be applied to generate stimulus streams configured to produce various test results indicating corresponding positive or negative verification data. A key advantage of constrained random test methodologies over directed test approaches is that a large number of different stimulus streams can be generated in a substantially shorter amount of time than could be generated using directed test methods, thereby facilitating far more comprehensive functional verification data during a given development period than could be produced using directed text methodologies.

Conventional constraint solvers utilized in early EDA software tools were configured to solve most constraint problems using conventional decision procedures (e.g., Automatic Test Pattern Generation (ATPG) or satisfiability (SAT) algorithms), which are based on efficient backtracking techniques. A problem with these conventional constraint solvers is that conventional decision procedures do not work well when required to generate stimulus streams that comply with two or more constraints that are dependent on each other (i.e., where modifications to the test vector values of a stimulus stream that are required to satisfy one of the related constraints may cause the stimulus stream to be non-compliant with another of the related constraints).

More recently developed constraint solvers use both decision procedures and ILP (Integer Linear Programming) techniques to generate stimulus streams satisfying two or more related constraints. The combination of decision procedure and ILP technique works well with multiple related constraints that are loosely dependent on each other (i.e., where most stimulus stream modifications entered to satisfy one related constraint typically does not cause non-compliance with other related constraints). However, this simple approach doesn't work well in cases where a stimulus stream must comply with multiple related constraints that are more significantly dependent on each other, and typically fails in cases where a stimulus stream is subject to multi-dimensional constraints (e.g., one or more time/row constraints and one or more node/column constraints or diagonal constraints). Conventional constraint solvers that use decision procedures and ILP techniques are typically able to efficiently generate stimulus streams complying with one or more constraints of the same one-dimensional type (i.e., two or more time/row constraints, two or more node/column constraints, or two or more diagonal constraints). However, when faced with the task of generating stimulus streams that comply with multi-dimensional constraint (referred herein to as a multi-dimensional constraint problem), the approach utilized by conventional constraint solvers (i.e., using decision procedures and ILP techniques) causes an excessively large number of backtracks in the decision procedure by using the ILP solver to revise test vector values for one type of constraint (e.g., column constraints) without considering the revision's effect on constraint types (e.g., row or diagonal constraints). The large number of backtracks occur because solving a stimulus stream to comply with one constraint type is likely to create non-conformance with the other constraint types. Accordingly, conventional constraint solvers that use both decision procedures and ILP techniques require a long period of time to generate test vectors that satisfy multi-dimensional constraints, thereby delaying circuit design development and increasing overall production costs.

What is needed is a constraint solver and associated methods capable of automatically generating stimulus streams that comply with multi-dimensional constraints in a short amount of time. In particular, what is needed is multi-dimensional constraint solver for EDA software tools capable of quickly generating multiple different stimulus streams for use in constrained random test-type simulation processes during functional verification of circuit designs.

SUMMARY OF THE INVENTION

The present invention is directed to a multi-dimensional constraint solver that utilizes a modified relaxation process to quickly automatically generate stimulus streams that are compliant, with multi-dimensional constraints. The modified relaxation process includes two sequentially executed revision phases: a first revision phase during which a partial solution is generated by changing selected test vector values such that the array complies with the constraints of only one dimension (e.g., row constraints); and a second revision phase during which array elements having the greatest impact on the currently composed array's non-compliance with one or more of the remaining multi-dimension constraints (e.g., column constraints and/or diagonal constraints) are systematically identified, and the identified elements' test vector values are revised (i.e., increased or decreased) such that each revision (a) reduces or eliminates the array's non-compliance with the one or more of the remaining multi-dimension constraints, and (b) maintains all first-dimension constraints. These two sequentially executed revision phases collectively facilitate convergence of randomly generated arrays to solutions that comply with multi-dimensional constraints at a rate that is not possible using currently available conventional techniques.

According to a practical embodiment, the multi-dimensional constraint solver provides a computer implemented method that is incorporated into an EDA software tool, and serves to generate multiple different stimulus streams that are used in simulation-type functional verification processes during the development of electronic circuit designs using the EDA software tool. Operation of multi-dimensional constraint solver is typically initiated after a user has entered into the EDA tool both parameters that define the size and data type of each desired stimulus stream, and a set of multi-dimensional constraints. In an exemplary embodiment, the multi-dimensional constraint solver begins the generation of each stimulus stream by establishing an array framework including elements that are arranged (cooperatively interrelated) in rows and columns having sizes determined by the user-defined parameters. The multi-dimensional constraint solver then assigns randomly generated initial test vector values to at least some of the array elements. The two sequentially executed phases making up the modified relaxation process are then performed to generate the partial array solution, and then to revise the partial solution until the array converges on a complete solution that complies with all of the multi-dimensional constraints. In an exemplary embodiment, the first revision phase is performed using row constraints as the first-dimension constraints, and the first revision phase involves identifying rows of the array that are non-compliant with the row constraints, and revising (i.e., increasing or decreasing) randomly selected test vector values in each non-compliant row until all rows of the array comply with all row constraints. As mentioned above, the other multi-dimensional constraints (i.e., one or more second-dimension constraints, such as column constraints in cases where multi-dimensional means two-dimensional, or column and diagonal constraints in cases where multi-dimensional means three-dimensional) are ignored (disregarded) during the first revision process to facilitate rapid convergence on a solution that satisfies only the row constraints. After the first revision phase generates a partial solution (i.e., revises the array to comply with first-dimension constraints, the second revision phase is then performed in a series of cycles, with each cycle being initiated after determining that the array is not yet compliant with all multi-dimensional constraints. Each cycle of the second revision phase includes identifying a current element having a greatest impact on non-compliance of the array with respect to the second-dimension constraints, and then revising the test vector value of the current element such that revised test vector value (a) reduces the array's non-compliance amount, while (b) maintaining compliance of the array with the first-dimension constraint(s). Using the example established above, the current element identified during each cycle of the second revision phase would be based on each elements impact on the array's non-compliance with column constraints and/or diagonal constraints (i.e., the remaining multi-dimensional constraints), and revisions to the current element's test vector value would be performed in a manner that (a) minimizes or eliminates the array's non-compliance with the column and/or diagonal constraints, and (b) does not cause any row of the array to become non-compliant with any row constraints. Successful completion of the second revision phase produces a final array solution compliant with all multi-dimensional constraints, whereby the final array solution may be utilized to form a corresponding stimulus stream for use during functional verification of a target circuit design prior to utilization of the target circuit design to manufacture a corresponding physical circuit. By utilizing the modified relaxation technique to simultaneously address multi-dimensional constraints in the manner set forth above, the present invention provides a constraint solver/method that facilitates the automatic generation of multiple stimulus streams that comply with a given set of multi-dimensional constraints in substantially less time than is required using conventional constraint solvers, thereby reducing overall circuit manufacturing time and cost.

According to a presently preferred embodiment, after establishing the array elements in rows and columns, a random generator (or an equivalent software tool) is utilized to select the initial test vector values assigned to each element, where each assigned initial test vector value is randomly selected from one or more sets of valid element values. That is, the user-defined parameters utilized by the constraint solver to establish the stimulus stream array (e.g., global variables and/or relevant constraints fixing the number of elements in each row and column of the array) also include parameters that may be used to establish valid element values for each element of the array (e.g., when the test vector values are user-defined as binary values, each assigned initial test vector value is randomly selected from the set of "1" and "0"). In some cases, certain specified elements of the array are restricted to corresponding fixed text vector values (e.g., where all elements in a select column are required to include a pre-determined test vector value in the final array solution), whereby assignment of initial test vector values is limited to the pre-determined value (and subsequent revisions to these specified elements is prevented). However, randomly assigning valid initial test vector values to the remaining (non-restricted) elements serves to provide random seeding of the initial array configuration, whereby subsequent processing of the multi-dimensional constraint solver is biased to produce multiple different solutions to the same constraint problem (i.e., two or more stimulus streams that comply with a given set of multi-dimensional constraints, but the test vector value stored in each element of one stimulus stream differs from the test vector value stored in a corresponding element of the remaining stimulus streams).

According to an specific embodiment, the first revision phase of the modified relaxation process involves identifying non-compliant rows of an array, and changing one or more test vector values in each non-compliant row of the array until every row of the array complies with all of the row (first-dimension) constraints of the multi-dimensional constraints. For example, when the row constraints define a valid row-sum value or a range of valid row-sum values, then test vector values of elements disposed in each non-compliant row are increased or decreased until a sum of the test vector values of all elements disposed in the non-compliant row complies with the valid row-sum value or valid row-sum range. In a presently preferred embodiment, the first revision phase includes randomly selecting an element in a given non-compliant row, and revising (i.e., increasing or decreasing) the test vector value of the randomly selected element to reduce or eliminate the amount of non-compliance with the valid value/range set by the row constraints. Randomly selecting elements in each non-compliant row for revision during the first revision phase further facilitates the production of different stimulus stream solutions.

According to alternative specific embodiments, the modified relaxation process is either performed in a manner that completes the first revision phase in a minimal amount of time, or performed in a way that maximizes the random distribution of revisions entered during the first revision phase. In the first specific embodiment, the test vector value of each randomly selected element process is changed by a relatively large revision amount in order to minimize processing time minimizing the number of selection/revision iterations. In the second specific embodiment, the revision process for each non-compliant row is performed incrementally, with each revision iteration including the random selection of one of the elements disposed in the non-compliant row, and revision process involving incrementally increasing or decreasing the randomly selected element's test vector value. By utilizing this incremental revision approach, the total amount by which the given non-compliant row is increased or decreased is randomly distributed across the elements making up the non-compliant row, which further facilitates the production of multiple stimulus stream solutions that differ from each other. This incremental revision approach also facilitates detection of non-workable initial values for a given set of row constraints, for example, by setting a maximum limit on the number of iterations that may be performed for a given non-compliant row, and ending (e.g., restarting or aborting) the array generation process whenever the maximum limit is reached.

According to a presently preferred embodiment, the second revision phase identifies a current element at the beginning of each cycle by way of calculating an associated non-compliance amount for each element of the array, then selecting the current element having the greatest calculated non-compliance amount. The calculation of non-compliance amounts is performed such that each calculated non-compliance amount indicates an associated element's relative impact on non-compliance of the array to the second-dimension constraints. For example, when the second-dimension constraints define a valid column-sum value, calculating non-compliance amounts for each element involves generating a column-sum value for each array column (i.e., by adding the test vector values of all elements disposed in a given column), and the determining a column-sum (first) difference between each calculated column-sum value and the valid column-sum value. When the second-dimension constraints also define a valid diagonal-sum value, calculating a non-compliance amount for a given element may include generating a calculated diagonal-sum value by adding said test vector values of all elements disposed in each diagonal series that include the given element, calculating a diagonal sum (second) difference between the calculated diagonal-sum value and the valid diagonal-sum value, and then adding the column-sum difference to the diagonal-sum difference. When the calculated non-compliance amount values of two elements are equal (i.e., both elements have common (the same) non-compliance amount values) and represent the greatest non-compliance amount, one of the two elements is randomly selected as the current element for revision during the current cycle. By calculating non-compliance amounts for each element and selecting a current element for revision during each cycle based on a comparison of the calculated non-compliance amounts, the multi-dimensional constraint solver is able to rapidly converge on array solutions that comply with multi-dimensional constraints.

According to the presently preferred embodiment, revision of the selected current element during each cycle of the second revision phase involves the use of one or more first-dimension-neutral operations, which function to reduce the amount of non-compliance of the array to the second-dimension constraints while maintaining compliance of the array with the first dimension constraints. Some first-dimension-neutral operations include calculating post-revision non-compliance values for each of the other same-row elements disposed in the row including the current element, where the post-revision conflicts value for each same-row element is equal to the number of non-compliances of the array to the second-dimension (e.g., column and/or diagonal) constraints if that same-row element were changed by a minimum change amount (i.e., a minimum amount by which the current element could be changed to eliminate all applicable non-compliances with second-dimension constraints), which is either implemented using the current element's non-compliance amount, or separately calculated for the current element. In one specific embodiment involving pair-wise swapping, the test vector value of the selected current element is swapped (exchanged) with the test vector value of a selected same-row (second) element. In another specific embodiment the required revision is achieved by way of redistributing the required change amount between the current element and a selected (second) same-row element, whereby the test vector value of the selected current element is changed (e.g., decreased) by the calculated minimum change amount, and the test vector value of a selected same-row (second) element is changed (e.g., increased) by an opposite amount (i.e., such that a sum of the two corresponding test vector value revisions equals zero). In one embodiment, both the pair-wise swap and redistribution operations are performed such that the second element is selected based which same-row element has the greatest corresponding post-revision conflicts value, which indicates that swapping or redistributing with the associated same-row element would generate the greatest reduction in the array's non-compliance with the second-dimension constraints. A benefit of the pair-wise swapping and redistribution operations is that each corresponding pair of revisions can be used to correct two or more non-compliances (e.g., to address column constraint violations in both the current element's column and in the selected same-row element's column), which may reduce the number of cycles required to perform the second revision phase. Moreover, because pair-wise swapping and redistribution only change the order or individual test vector values included in each row, not the sums of test vector values of each row, these approaches avoid the need to recalculate the row-sum value for the current element's row. Another alternative first-dimension-neutral operation involves monotonically changing (i.e., increasing or decreasing) the current element without changing any same-row elements. In this embodiment, a row-slack value is calculated for the current element's row (i.e., an amount by which the associated row-sum value could be changed without causing current element's row to become non-compliant with the row constraints), and the current element's test vector value is then changed by the lesser of the second-dimension minimum change amount and the row-slack value. That is, the current element's test vector value is increased/decreased by the minimum change amount when the row-slack value is greater, and the test vector value is increased/decreased by the row-slack value when the minimum amount is greater). Although the monotonic operation only addresses non-compliance of the selected current element, it may be performed using fewer calculations that those required to perform the pair-wise swapping and redistribution operations mentioned above, which reduces the time to complete each cycle. However, utilizing any of the first-dimension-neutral operations mentioned above greatly facilitates the multi-dimensional constraint solver's ability to rapidly converge on array solutions that comply with multi-dimensional constraints.

According to alternative embodiments, when the multi-dimensional constraint solver is tasked to generate stimulus streams complying with constraints in three or more dimensions (i.e., where the second-dimension constraints include, e.g., column constraints and diagonal constraints), the second revision phase is either performed in a single phase that solves the array for all second-dimension constraints simultaneously, or performed in two sub-phases, for example, where the first sub-phase produces a (second) partial array solution that complies with one of the second-dimension constraints (e.g., column constraints), and then second sub-phase produces a final array solution that complies with all multi-dimensional constraints. Although both the single-phase approach and the multiple-phase approach are capable of generating arrays that comply with constraints in three or more dimensions, the multiple-phase approach is currently believed to produce a greater number of solutions in less time than the single-phase approach.

BRIEF DESCRIPTION OF THE DRAWINGS

These and other features, aspects and advantages of the present invention will become better understood with regard to the following description, appended claims, and accompanying drawings, where:

FIG. 2 depicts exemplary global variables, multi-dimensional constraints and array variables utilized by the multi-dimensional constraint solver of FIG. 1 to automatically generating stimulus streams according to a specific embodiment of the present invention;

FIG. 3 depicts an exemplary array established by the multi-dimensional constraint solver of FIG. 1 at the beginning of the stimulus stream generation process;

FIGS. 6A, 6B and 6C depict exemplary first revision phase processing of a first row of the array of FIG. 4A using the process of FIG. 5;

FIG. 7 depicts exemplary first revision phase processing of a second row of the array of FIG. 4A using the process of FIG. 5;

FIGS. 8A, 8B, 8C, 8D and 8E depict exemplary first revision phase processing of a third row of the array of FIG. 4A using the process of FIG. 5;

FIG. 10 depicts calculation of exemplary non-compliance amounts and identification of elements with test vector values having a greatest impact on non-compliance of an array to two-dimensional (2D) constraints using the second revision phase process of FIG. 9;

FIGS. 11A, 11B and 11C depict alternative exemplary pair-wise swapping and redistribution operations utilized in accordance with specific embodiments to revise a selected array element of the array of FIG. 10 while maintaining row constraints during second revision phase processing;

FIGS. 12A and 12B depict an exemplary monotonic increase/decrease operation utilized in accordance with other specific embodiments to revise a selected array element of the array of FIG. 10 while maintaining row constraints during second revision phase processing;

FIG. 13 depicts a revised array prior to performing a second cycle of second revision phase processing involving 2D constraints using the process of FIG. 9;

FIGS. 14A and 14B depict revisions of a selected test vector value of the array of FIG. 13 during the second cycle using a monotonic change approach;

FIG. 17 depicts the array of FIG. 15 after entering the revisions of FIGS. 16A and 16B, and depicts calculation of exemplary non-compliance amounts and identification of a second current element for revision during a second cycle of the second sub-phase;

FIGS. 18A and 18B depict revision of a selected test vector value of the array of FIG. 17 during the second sub-phase using a distribution operation;

FIG. 19 depicts the array of FIG. 17 after entering the revisions of FIGS. 18A and 18B, and depicts calculation of exemplary non-compliance amounts and identification of a third element for revision during a third cycle of the second sub-phase;

FIGS. 20A and 20B depict revision of a selected test vector value of the array of FIG. 19 during the third cycle of the second sub-phase using a monotonic decrease operation;

FIGS. 23 and 24 are diagrams depicting partial solutions of an eight row N-Queens problem generated by the multi-dimensional constraint solver of FIG. 1 according to another exemplary embodiment;

FIG. 25 is a diagram depicting multi-dimensional constraint values utilized by the multi-dimensional constraint solver during solution of an N-Queens problem according to another exemplary embodiment;

DETAILED DESCRIPTION OF THE DRAWINGS

The present invention relates to an improved constraint solver and associated methods for use during the development of circuit designs that are subsequently utilized in the fabrication of physical circuits based on the circuit designs. The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to provide a thorough understanding of one or more of the exemplary embodiments. In the interest of not obscuring the presentation of embodiments of the claimed inventions, in the following Detailed Description, some processing steps or operations that are known in the art may have been combined together for presentation and for illustration purposes and in some instances may have not been described in detail. However, a person skilled in the art will recognize that these embodiments may be used in commerce without these specific details or with equivalents thereof. In other instances, well-known processes and devices are not described in detail as not to unnecessarily obscure aspects of these embodiments. In other instances, some processing steps or operations that are known in the art may not be described at all. The following description is instead focused on the distinctive features or elements of various embodiments of the claimed inventions. Furthermore, while this description may refer to some components of the structure in the singular tense, more than one component may be depicted throughout the figures and like components are labeled with like numerals.

Figure 1:
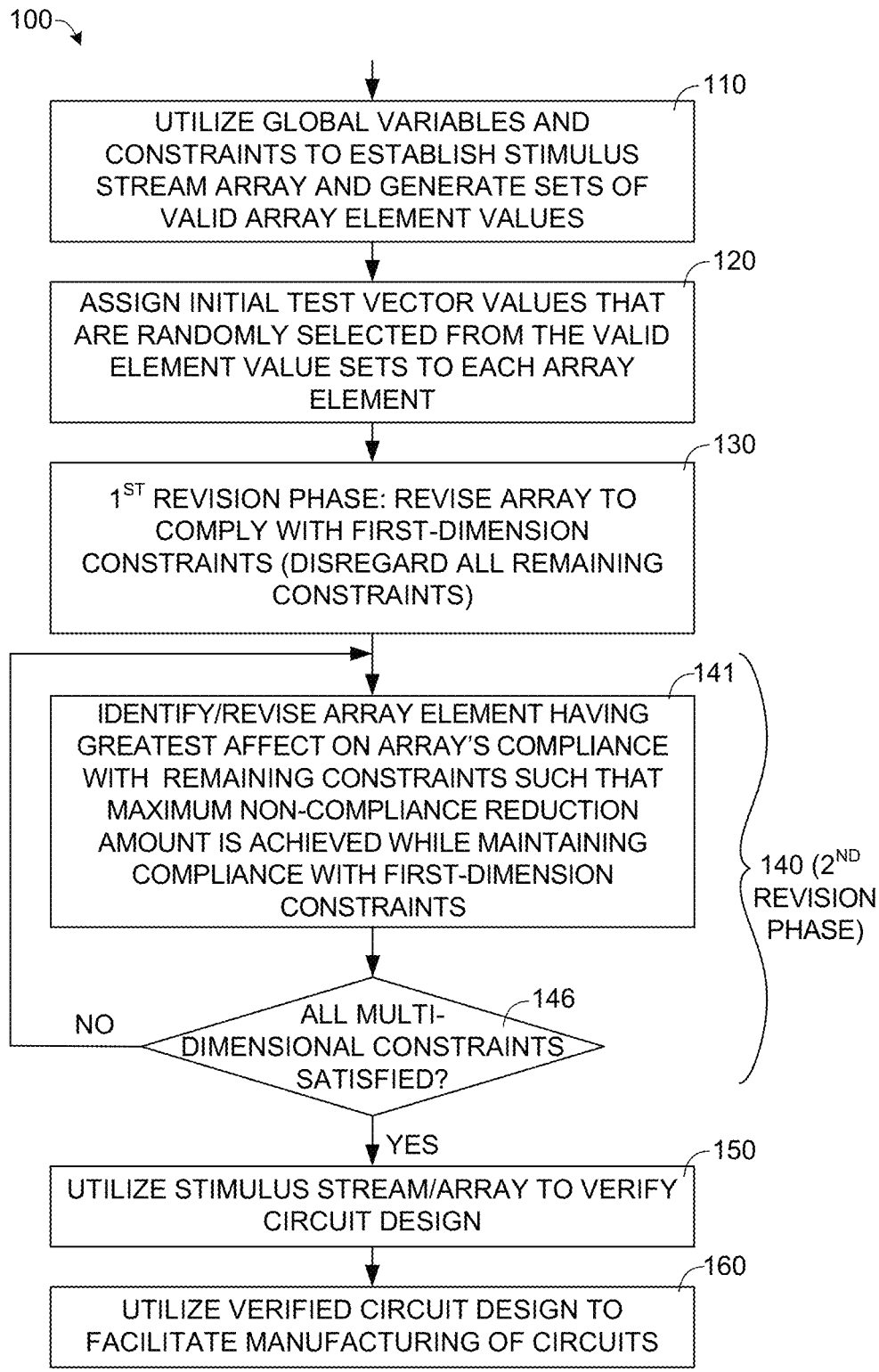
FIG. 1 is a flow diagram showing a method for automatically generating stimulus streams performed by a multi-dimensional constraint solver according to a generalized embodiment of the present invention.
Figure 28:
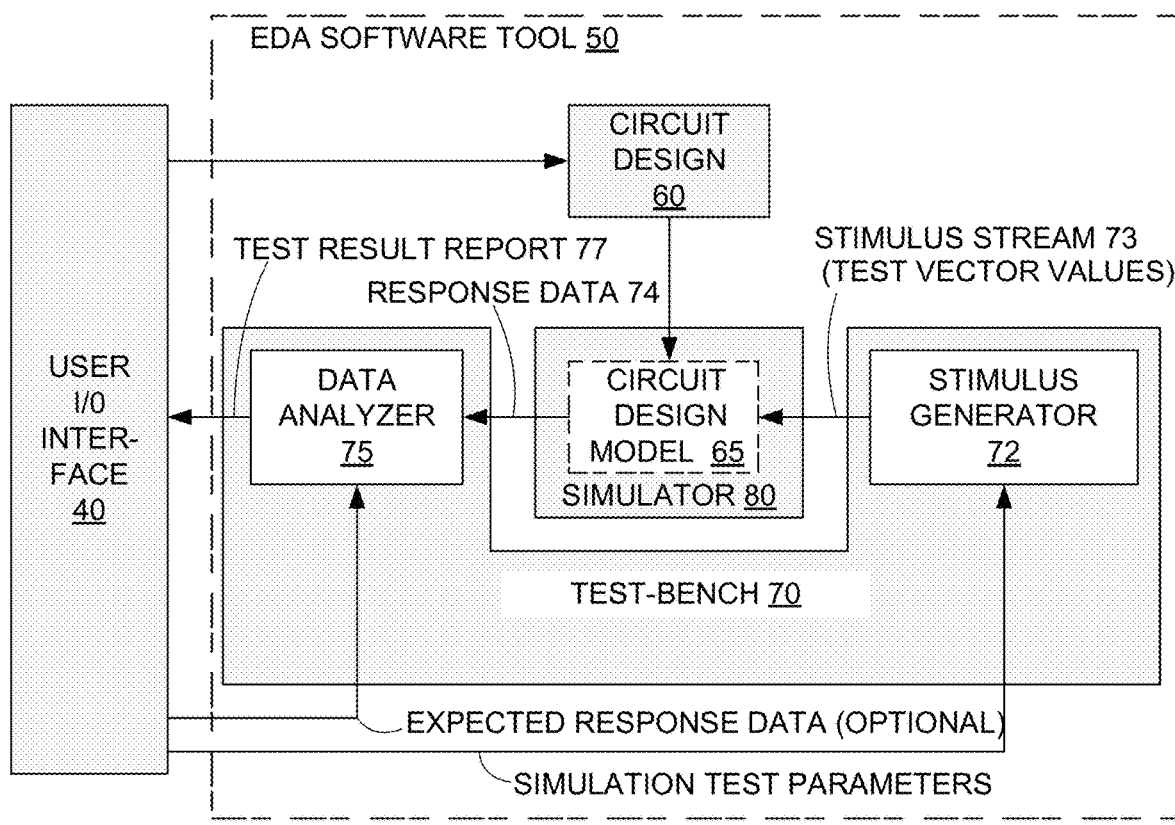
FIG. 28 is a block diagram depicting an EDA tool including a test bench having a constraint solver.
Figure 29:
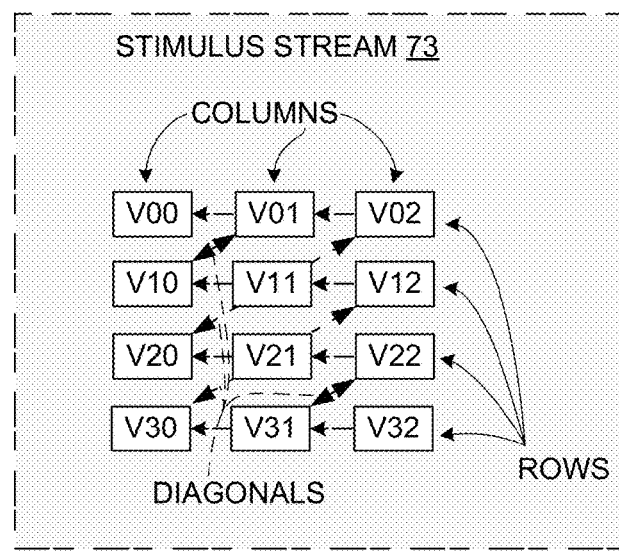
FIG. 29 is a simplified diagram depicting the transmission of a stimulus stream to a circuit design model during simulation-type verification of the circuit design model.

FIG. 1 is a flow diagram that functionally depicts a multi-dimensional constraint solver 100 configured to automatically generate multiple different stimulus streams according to a generalized embodiment of the present invention. As established above, the stimulus streams generated by constraint solver 100 are generated for use during simulation-type functional verification of a target circuit design, which is performed during development of the target circuit design for subsequent fabrication of an associated integrated circuit device. In a preferred embodiment, constraint solver/method 100 is implemented as part of a test-bench, which in turn is utilized by and part of a host EDA software tool in the manner described above with reference to FIGS. 28 and 29 (e.g., such that constraint solver/method 100 comprises at least a portion of stimulus generator 72, and stimulus streams generated by constraint solver/method 100 are operably configured for application to corresponding target circuit design as described above with reference to FIG. 28). In the preferred embodiment, the instructions performed by constraint solver 100, which described below with reference to FIG. 1 and the other figures, are implemented using a suitable software language (e.g., Verilog) configured such that, when executed by a computer's processor, cause the processor to automatically generate stimulus streams having the characteristics described herein.

According to an aspect of the invention, multi-dimensional constraint solver 100 is configured to automatically generate stimulus streams such that each stimulus stream includes an array of test vector values that comply with one or more first-dimension constraints and at least one or more second-dimension constraint. As understood in the art, the term "solver" refers to computer-executed mathematical software, possibly in the form of a program or as a software library, that solves a mathematical problem, and a "constraint solver" is a specific type of solver utilized in EDA software tools to automatically generate patterns of test vector values that comply with one or more constraints, whereby the test vector value patterns that are successfully generated by a constraint solver may be converted into corresponding stimulus streams using methods known in the art. As is understood the in art, the test vector value patterns typically converted into corresponding stimulus streams may be mathematically represented using two-dimensional arrays in which the test vector values are arranged in parallel horizontal rows and parallel vertical columns, whereby each row includes a series of test vector values that are related in a first dimension, and each column includes series of test vector values related in a second dimension. Those skilled in the art understand that this array analogy is a convenient abstraction that facilitate the generation and analysis of stimulus streams using mathematical techniques, and that in physical applications stimulus streams do not occupy rows and columns in a spatial manner. As used herein, the phrases "first-dimension constraints" and "row constraints" refer to constraints applied to test vector values cooperatively interrelated in the first (row) dimension of each array, and the phrase "second-dimension constraints" refer to constraints applied to test vector values cooperatively interrelated in either the second (column) dimension, or a third (e.g., diagonal) dimension. That is, one or more second-dimension constraints may include one or more "column constraints" (i.e., constraints applied to test vector values cooperatively interrelated in the column dimension), one or more "diagonal constraints" (i.e., constraints applied to test vector values cooperatively interrelated in one or more diagonal dimensions), one or more constraints in other dimensions (e.g., byte-type value constraints), or a combination of one or more of column constraints, diagonal constraints and/or other constraints. Similarly, the phrase "multi-dimensional constraints" refers to a combination including one or more first-dimension constraints and one or more second-dimension constraints. In this context, constraint solver/method 100 implements a modified constrained random test methodology that uses modified relaxation techniques to automatically generate stimulus streams, where the array of test vector values is generated such that it complies with multi-dimensional constraints (e.g., including a row constraint and one or more column constraints and/or diagonal constraints).

Referring to the upper portion of FIG. 10, the methodology performed by constraint solver 100 begins by utilizing user-defined global variables and constraints as parameters to establish a stimulus stream array (referred to below simply as "array") made up of elements that are cooperatively interrelated in rows and columns (block 110), and then to initialize the array such that each element includes an associated randomly selected valid test vector value (block 120). The process of establishing an array according to block 110 is described in additional detail below with reference to FIGS. 2 and 3, and the process of providing the array with initial test vector values is explain below with reference to alternative examples depicted in FIGS. 4A and 4B.

Referring to block 130 in FIG. 1, after the array is established and initialized, the methodology performed by constraint solver 100 performs a first revision phase during which selected initial test vector values are systematically revised until the array complies with all first-dimension constraints. For example, as described below with reference to FIGS. 5 through 8E, the first revision phase involves identifying each row of the array that fails to comply with at least one row constraint, and then increasing or decreasing selected test vector values of elements located in the non-compliant rows until every row complies with all row constraints. According to an aspect of the invention, other multi-dimensional constraints (e.g., column constraints and/or diagonal constraints) are ignored (disregarded) during the first revision process to facilitate rapid convergence on a solution that satisfies the row constraints.

Referring to block 140 in FIG. 1, once the first revision phase is successfully completed (e.g., when all rows of the array comply with all row constraints), constraint solver 100 then performs a second revision phase that utilizes modified relaxation techniques to systematically identify test vector values having a greatest impact on non-compliance of the array to the remaining multi-dimension constraints (e.g., column constraints and diagonal constraints), and to revise these test vector values to reduce the calculated non-compliance amount as much as possible while maintaining the array's compliance with the first-dimension constraint. As explained below in additional detail with reference to FIGS. 9-25, at the end of each cycle the array is checked for compliance with all of the multi-dimensional constraints (block 145), and the modified relaxation process is repeated until the array converges on a solution that complies with all of the multi-dimensional constraints.

Referring to the bottom of FIG. 1, in one embodiment the EDA tool utilizes arrays generated by constraint solver 100 as corresponding stimulus streams during functional verification of a target circuit design (block 150), and generates a final version of the target circuit design for use during subsequent fabrication of physical circuits (FDA tools typically generate final versions of a circuit design in a form that facilitates efficient, manufacture, but, do not participate in the manufacturing process). Additional details regarding the processes performed in accordance with blocks 150 and 160 are presented below with reference to Figs.

The methodology performed by constraint solver 100 that is described above with reference to FIG. 1 will now be described in additional detail with reference to simplified exemplary practical embodiments. The simplified embodiments utilize arrays having a small number of elements for purposes of explaining the various processes and calculations implemented by constraint solver 100. Although the simplified examples may suggest that the various processes and calculations are executable by hand (although the calculations associated with even the simplest examples could take many hours to perform by hand), in practical embodiments involving arrays having tens to hundreds of rows and hundreds to thousands of columns, it is effectively impossible (or at least entirely impractical) to perform all of the various processes and calculations by hand, whereas the processes and calculations are executable using a computer in a very short amount of time.

FIG. 2 depicts a table 200 including exemplary global variables, multi-dimensional constraints and array variables that are initialized and utilized by multi-dimensional constraint solver 100 (FIG. 1) as explained with reference to the examples described below. As explained in the following paragraphs, the exemplary global variables, multi-dimensional constraints and array variables are grouped and identified using reference numbers 201 to 207 to indicate related array features and constraints affected by each referenced group. Those skilled in the art will understand that the listed variables and constraints shown in FIG. 2 are simplified for brevity, and that novel aspects of the invention are not in any way restricted by the specific list provided in FIG. 2.

Referring to the upper portion of FIG. 2, reference number 201 refers to a group of global variables utilized by constraint solver 100 to establish a stimulus stream array according to an exemplary embodiment of the process indicated in block 110 of FIG. 1 and depicted in FIG. 3. Specifically, group 201 includes Array[row][col], NumRow and NumCols that are utilized to establish the array size (i.e., the number of rows and columns) using user-provided settings. FIG. 3 depicts an exemplary array 300 in which NumRow is set at three and NumCols is set at six, whereby array 300 includes three rows ROW0, ROW1 and ROW2, and includes six columns COL0 to COL5. For purposes of explanation, array 300 is described as including elements E00 to E25, where each element is disposed (cooperatively interrelated) in a corresponding row and a corresponding column such that the corresponding sequences of elements forming each row and column include that element. For example, element E01 is disposed in row ROW0 and column COL1, where row ROW0 is made up of the sequence of elements E00 to E05 (i.e., which includes element E01), and column COL1 is formed by the sequence of elements E01, E11 and E21. Similarly, element E24 is disposed in row ROW2 and column COL4, where row ROW2 is made up of the sequence of elements E20 to E25 (i.e., which includes element E24), and column COL4 is formed by the sequence of elements E40, E41 and E42.

Referring again to FIG. 2, second group 202 includes constraints VMin and VMax, which establish minimum and maximum test vector values, respectively, that may be stored in each element location. That is, referring again to FIG. 3, for descriptive purposes each element E00 to E25 includes a corresponding test vector value V00 to V25, and constraints VMin and VMax restrict the valid value that may be stored in each test vector value V00 to V25. For example, to restrict test vector values V00 to V25 to binary data values, constraints VMin and VMax would be set by a user at "0" and "1", respectively, whereby each test vector value V00 to V25 can only equal to "0" or "1". Note that, as established by the examples set forth below, the methodology of the present invention is not limited to binary test vector values (i.e., each test vector value may be a multi-bit value of any practical size). As set forth below, once an array is established, the test vector values of each element may be revised (changed), but the position of each element remains fixed within the array. For example, test vector value V22 of element E22 may be changed during the process described below, but the position of element E22 within array 300 cannot be changed (i.e., element E22 remains in row ROW2 and column COL2).

Referring again to FIG. 2, third group 203 includes exemplary row constraints RowSumMin and RowSumMax, and array variable RowSum[row]. Global variable RowSum[row] establishes row-sum values calculated for each row of an array, where each row-sum value is a mathematical sum of the test vector values stored in the elements of the associated row. Referring to exemplary array 300 (FIG. 3), array variable RowSum[row] is utilized to establish row-sum values RowSum0, RowSum1, RowSum2 (shown along the right edge of FIG. 3), which respectively store row-sum values for rows ROW0, ROW1 and ROW2 (i.e., row-sum value RowSum0 is calculated by summing test vector values V00 to V05, row-sum value RowSum1 is calculated by summing test vector values V10 to V15, and row-sum value RowSum2 is calculated by summing test vector values V20 to V25). Row constraints RowSumMin and RowSumMax serve to define a valid row-sum range for each row of a compliant array by way of allowing the user to set minimum and maximum row-sum values of test vector values stored in each compliant row. In the examples described below, row constraints RowSumMin and RowSumMax are respectively set at 16 and 30, meaning that a given row ROW0, ROW1 or ROW2 is compliant with all row constraints (i.e., RowSumMin and RowSumMax) when its associated row-sum value is between 16 and 30, and a given row is non-compliant with at least one row constraint when its associated row-sum value is greater than 30 or less than 16. For brevity, compliance of an array to all row constraints is established in the examples set forth below using only the valid row-sum range established by row constraints RowSumMin and RowSumMax, but it is understood that the present invention is also applicable to cases in which array are subject to additional row constraints (e.g., one or more valid row-sum values, or multiple valid row-sum ranges, as well as other types of row constraints known to those skilled in the art).

Fourth group 204 (FIG. 2) includes exemplary column constraints ColSumMin and ColSumMax, which serve to define a valid column-sum range for each column of a compliant array, and array variable ColSum[row] is used to establish column-sum values for each column of an array (i.e., sums of the test vector values stored in the elements forming each column). Referring to the lower of FIG. 3, column-sum values ColSum0 to ColSum5 are respectively established and updated for each column COL1 to COL5 of array 300 (i.e., where column-sum value ColSum0 is calculated by summing test vector values V00, V10 and V20, column-sum value ColSum1 is calculated by summing test vector values V01, V11 and V21, column-sum value ColSum2 is calculated by summing test vector values V20, V21 and V22 . . . and column-sum value ColSum5 is calculated by summing test vector values V05 to V25). As utilized in the examples set forth below, column constraints ColSumMin and ColSumMax define minimum and maximum valid values of a valid column-sum range for column-sum values ColSum0 to ColSum5 (i.e., if any of column-sum values ColSum0 to ColSum5 are less than column constraint ColSumMin or greater than column constraint ColSumMax, then the associated column is non-compliant with the established column constraints). As with the row constraints, the column constraints and associated values referenced below are selected for descriptive purposes, and are not intended to be limiting.

Fifth group 205 (FIG. 2) includes exemplary diagonal constraints DSumMin and DSumMax that define a valid diagonal-sum range for test vector values aligned in each diagonal series of elements in the array, and array variable DSum[dia] is used to establish diagonal-sum values utilized to store the sum of the test vector values in each diagonal series. Referring to FIG. 3, six exemplary diagonal series D11 to D16 are respectively indicated by rightward-directed dashed line arrows (i.e., where diagonal D11 includes diagonally aligned elements E10 and E01, diagonal series D12 includes diagonally aligned elements E20, E11 and E02, etc.), and six additional diagonal series D21 to D26 are indicated by leftward-directed dashed line arrows (i.e., where diagonal D21 includes diagonally aligned elements E10 and E21, diagonal series D22 includes diagonally aligned elements M0, E11 and E22, etc.). As also shown in FIG. 3, diagonal-sum values DSum11 to DSum16 and DSum21 to DSum26 are calculated by summing the test vector values stored in the diagonally aligned elements in diagonal series D11 to D16 and D21 to D26, respectively. For example, diagonal-sum value DSum25 is calculated by summing test vector values V23, V14 and V05, and diagonal-sum value DSum22 is calculated by summing test vector values V00, V11 and V22. As explained in the examples set forth below, diagonal constraints DSumMin and DSumMax restrict the minimum and maximum valid values for diagonal-sum values DSum11 to DSum16 and DSum21 to DSum26 (i.e., if any of these diagonal-sum values are less than diagonal constraint DSumMin or greater than diagonal constraint DSumMax, then the associated diagonal series is non-compliant with the established diagonal constraints).

Referring to the lower portion of FIG. 2, two additional optional fields indicated by reference numbers 206 and 207 are provided for special cases described below. Reference number 206 includes a fixed value constraint Vfixed[row][col], which is in special "1.5D" cases (e.g., as described below with reference to FIG. 4B), where the test vector value stored in one or more array elements is limited to a single (fixed) value. Reference number 207 includes a MaxFails constraint value that is used, for example, to limit the number of iterations performed during the first revision phase described below with reference to FIG. 5.

According to an embodiment of the invention, a set of valid test vector values is determined for each element of the array based on relevant global variable values and/or constraints, and then the initial test vector (element) value assigned to each element (i.e., per block 120 of FIG. 1) is randomly selected from the set of valid test vector values determined for that element. In exemplary embodiments described below with reference to FIGS. 4A and 4B, which utilize the global variable values and constraints described above with reference to FIG. 2, determining sets of valid initial element values for each element E00 to E25 is based on user-defined values assigned to value range constraints VMin and VMax and fixed value constraint Vfixed[row][col]. According to an aspect of the present invention, once a valid value set (i.e., a single value, or one or more ranges of values) is established for each element, an initial test vector value is randomly selected for each element from the set of valid values and assigned to that element. That is, as explained above, the purpose of constrained random test-type simulation is to apply as many different stimulus streams as possible to a circuit design model, and the main function of a constraint solver is to generate as many different stimulus streams as possible, provided all of the stimulus streams are compliant with established constraints. The generation of different stimulus streams is greatly facilitated by way of "seeding" each array with a different set of randomly selected initial test vector values, where each different set of initial test vector values biases the constraint solver into converging on different solutions.

Figure 4A:
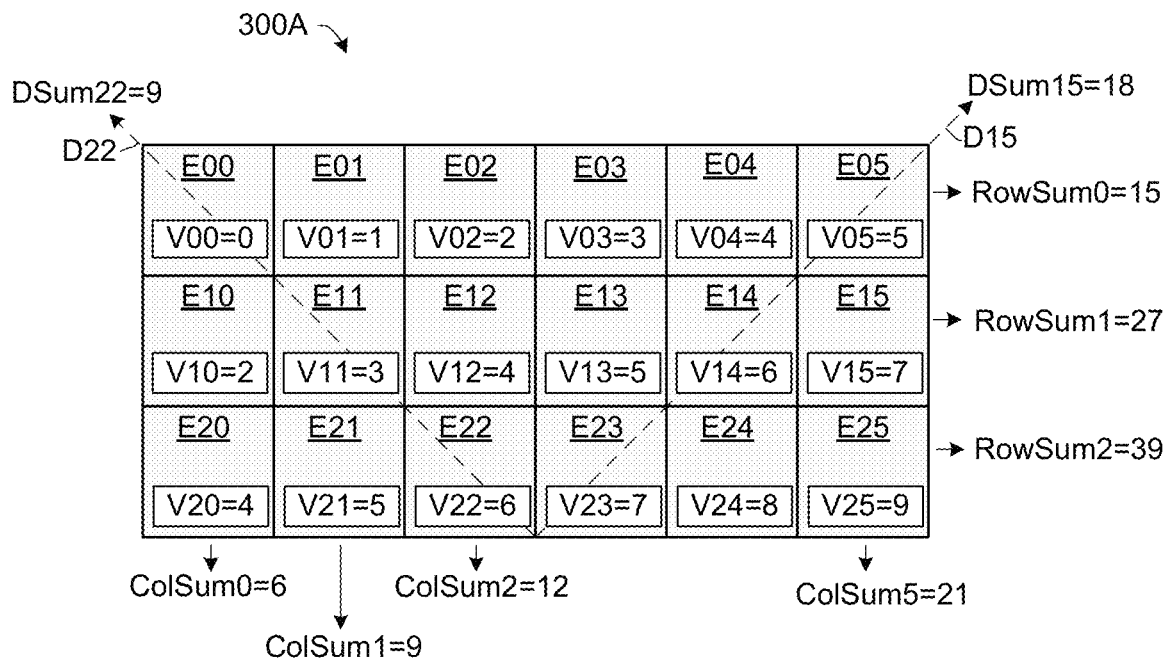
FIGS. 4A and 4B depict the exemplary array of FIG. 3 after initial test vector values are assigned to each element according to alternative exemplary embodiments.
Figure 4B:
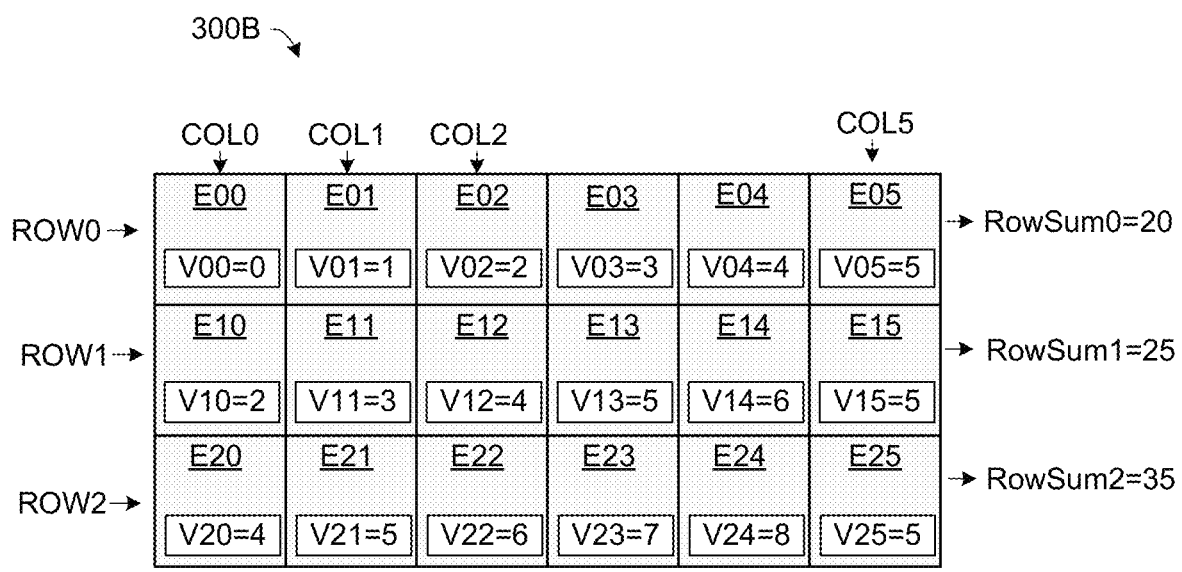

FIGS. 4A and 4B depict the process of assigning randomly selected initial values to the array elements (block 120 of FIG. 1) based on user-defined values assigned to value range constraints VMin and VMax according to two alternative exemplary embodiments.

FIG. 4A illustrates array 300A, which includes elements E00 to E25 configured in the manner described above with reference to FIG. 3, after test vector values V00 to V25 have been seeded with initial test vector values. In this example value range constraints VMin and VMax are respectively set at zero (0) and nine (9), and no (zero) elements are restricted using fixed value constraint Vfixed[row][col], whereby the set of valid test vector values for every element E00 to E25 is determined to be in the range of 0 to 9. Accordingly, during assignment of initial test vector values, each test vector value V00 to V25 is selected randomly from the series 0, 1, 2, 3, 4, 5, 6, 7, 8 and 9. For purposes of simplifying the calculations used to describe the present invention, this random selection process is assumed to generate the unlikely test vector value sequence 0 through 5 in row ROW0, test vector value sequence 2 through 7 in row ROW1, and test vector value sequence 4 through 9 in row ROW2 (i.e., it is highly unlikely that these sequences would be generated if each test vector value was randomly selected from the series 0 to 9, but the values depicted in FIG. 4A is used because they are conductive to explaining features of the present invention that are described below).

FIG. 4B illustrates an array 300B, which also includes elements E00 to E25 configured in the manner described above with reference to FIG. 3. In this example the elements of column COL5 are restricted by corresponding entries of fixed value constraint Vfixed[row][col] to the numeric value "5" (e.g., by way of a user defining range value constraint Vfixed[i][5]=5), and the set of valid values for all remaining elements is determined to be in the range of zero and nine (i.e., by way of setting value range constraints VMin and VMax to zero and nine, as in the example described above with reference to FIG. 4A). During the resulting seeding process, the initial values assigned to the elements in each of the first five columns COL0 to COL0 are randomly selected from the determined valid value range of zero to nine in the manner described above with reference to FIG. 4A. In contrast, the sets of valid values determined for the elements of column COL5 are restricted to (i.e., include only) the numeric value five, and as such the random selection process utilized during assignment of values to elements E05, E15 and E25 is limited to the numeric value five. Accordingly, as indicated in FIG. 4B, the numeric value five is assigned and stored in each of test vector values V05, V15 and V25. Note that the restriction of specific test vector values in the manner described above also affects the revision process described below; that is, when an element selected for revision is restricted to a fixed numeric value, the process recognizes that the element's test vector value cannot be changed, and therefore typically selects another element for revision.

Figure 5:
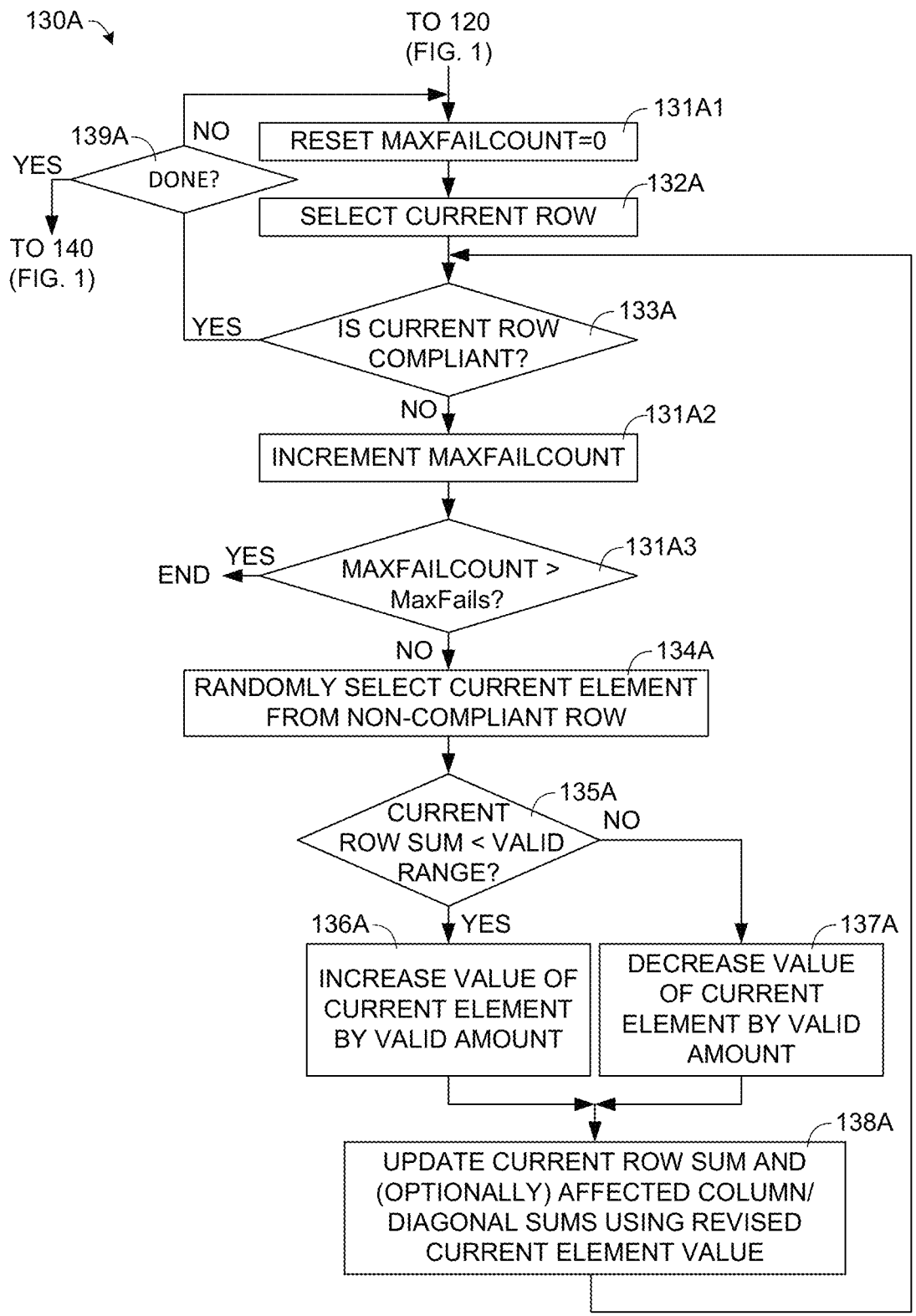
FIG. 5 is a flow diagram depicting a first revision phase process performed by the multi-dimensional constraint solver of FIG. 1 during the stimulus stream generation process according to a specific embodiment of the present invention.

FIG. 4A also indicates exemplary initial sums that may be optionally calculated after assignment of the initial element values. For example, FIG. 4A indicates that the initial element values V00 to V05 assigned to elements E00 to E05 in row ROW0 produce a row-sum value RowSum0 of 15, the initial element values V10 to V15 assigned to elements E10 to E15 in row ROW1 produce a row-sum value RowSum1 of 27, and the initial element values V20 to V25 assigned to elements E20 to E25 in row ROW2 produce a row-sum value RowSum2 of 39. Similarly, associated initial values in each column produce corresponding column-sum values (e.g., ColSum0 equal to six, ColSum1 equal to nine, ColSum2 equal to 2, and ColSum5 equal to 21), and associated initial values in each diagonal series produce corresponding diagonal-sum values (e.g., DSum22 equal to nine, and DSum15 equal to 18). FIG. 4B indicates how these sum values are changed FIG. 5 is a flow diagram depicting an exemplary first revision phase 130A of the modified relaxation process (i.e., corresponding to block 130 of FIG. 1), where the row constraints mentioned above are designated as the first-dimension constraints, and the remaining constraints are designated at second-dimension constraints (e.g., either column constraints or diagonal constraints when the multi-dimensional constraint solver encounters a two-dimensional constraint problem, or both column constraints and diagonal constraints when the multi-dimensional constraint solver encounters a three-dimensional constraint problem). Accordingly, first revision phase 130A functions to revise one or more test vector values in each non-compliant row (i.e., each row that violates at least one row constraint) until every row of the array complies with all row (first-dimension) constraints, where all second-dimension constraints (e.g., column and/or diagonal constraints) being disregarded during first revision phase 130A. In other embodiments, the first revision phase may involve the revision of array elements such that all columns of the array comply with all column constraints while disregarding all row and diagonal constraints, or the revision of array elements such that diagonal series of the array comply with all diagonal constraints while disregarding all row and column constraints.

As indicated at the top of FIG. 5, first revision phase 130A begins after initial test vector values are assigned to each element of a stimulus stream array per block 120 (FIG. 1). In the exemplary embodiment a counter field MAXFAIL-COUNT is optionally reset (block 131A1) before a current row is selected for analysis (block 132A) for reasons explained below. In the exemplary embodiment, selection of a non-compliant row of the array involves selecting each row one at a time (i.e., in block 132A) and then determining whether the currently selected row is compliant or non-compliant (as discussed below with reference to block 133A). For example, the current row selected during a first pass through block 132A is row ROW0 of array 300A in FIG. 4A, the second current row selected during a second pass through block 132A is row ROW1 of array 300A, etc. In other embodiments the non-compliant rows of a given array may be selected using other methods that are known in the art.

According to an optional feature of first revision phase 130A, the detection of non-workable initial value sets is enabled by way of resetting counter field MAXFAILCOUNT (block 131A1) before selecting each current row (block 132A), and then incrementally increasing counter field MAXFAILCOUNT (block 131A2) each time the current row fails to comply with all row constraints (i.e., each time the NO branch from decision block 133A is followed), and then terminating the process when counter field MAXFAILCOUNT equals the user-defined MaxFails constraint value (block 131A3), where the MaxFails constraint is discussed above with reference to FIG. 2. Blocks 131A1, 131A2 and 131A3 effectively form a counter loop that counts the number of first revision phase iterations performed for each non-compliant row, and terminates (i.e., restarting or aborting) the multi-dimensional constraint solver when MAXFAILCOUNT equals MaxFails. For brevity, this counter loop is ignored in the following description of first revision phase 130A (i.e., the following description assumes an array solution complying with all row constraints is achieved before the MaxFails constraint value is exceeded).

Referring to decision block 133A in FIG. 5, each first revision phase iteration for a selected current row begins when the selected current selected row is determined to be non-compliant. If the current row is non-compliant (NO branch from decision block 133A), then control passes to block 134A (i.e., by way of blocks 131A2 and 131A3, discussed above). Conversely, if the current row is compliant (YES branch from decision block 133A), then control passes to decision block 139A. If any rows of the array have not yet been processed (NO branch from block 139A), then control passes again to block 132A (i.e., by way of block 131A1, discussed above) for selection of a next-sequential current row. When all rows have been processed (i.e., first revision phase 130A successfully generates an array in which all rows are compliant with all row constraints), then control passes by way of the YES branch from block 139A to the second revision phase compliant (i.e., block 140 of FIG. 1).

Referring to block 134A (FIG. 5), each first revision phase iteration includes randomly selecting a current element from the group of elements disposed in the current non-compliant row. Subsequent blocks 135A to 138A depict a process of increasing or decreasing the test vector value of the selected current element in order to reduce a non-compliance amount of the selected non-compliant row according to an exemplary embodiment. First, a determination is made whether to increase or decrease the test vector value of the selected current element (e.g., by way of determining if the row-sum value calculated for the currently selected non-compliant row is above or below a valid row-sum range defined by the row constraints, as indicated in block 135A). If it is determined that the test vector value of the selected current element should be increased (e.g., if the current row-sum value of the currently selected non-compliant row is less than the valid range; YES branch from decision block 135A), then control passes to block 136A in which the test vector value of the selected current element is increased by a predetermined amount (e.g., an incremental amount such as binary-zero to binary-one). If it is determined that the test vector value of the selected current element should be decreased (e.g., if the current row-sum value of the currently selected non-compliant row is greater than the valid range; NO branch from decision block 135A), then control passes to block 137A in which the test vector value of the selected current element is decreased by the predetermined amount. Note that the revisions performed in blocks 136A and 137A are prevented when the required increase/decrease causes the selected current element to include a non-valid test vector value (i.e., a value that is not in the set of valid test vector values established for the selected current element, or when a fixed text vector value has been assigned to the selected current element). Once the revision (increase or decrease) to the selected current element has been made, control passes to block 138A, where the row-sum value for the currently selected row is updated in accordance with the revised test vector value, and then control passes back to decision block 133A to determine whether the currently selected row has achieved compliance with all row constraints based on the updated row-sum value. As also indicated in block 139A, one or more other second-dimension sum amounts (e.g., column-sum values and/or diagonal-sum values) may optionally be updated in accordance with each revised test vector value, but these updates may be postponed until the end of the first revision phase to minimize processing time.

First revision phase 130A will now be described with reference to FIGS. 6A to 8E, which depict relevant portions of simplified array 300A introduced above with reference to FIG. 4A. Specifically, FIGS. 6A to 6C depict processing associated with the uppermost row ROW0 of array 300A, FIG. 7 depicts processing associated with the middle row ROW1 of array 300A, and FIGS. 8A to 8E depict processing associated with the lowermost row ROW2 of array 300A.

FIGS. 6A to 6C depict a first pass through the loop formed by blocks 132A to 138A in FIG. 5, and illustrate an example in which the test vector value of a randomly selected element is increased in order to achieve compliance with all row constraints. Referring to FIG. 6A, row ROW0 is selected as the current row (block 132A in FIG. 5), and is then identified as a non-compliant row by way of determining whether row-sum value RowSum0 for row ROW0 is within the valid row-sum range defined between row constraints RowSumMin and RowSumMax, which are arbitrarily set at 16 and 30, respectively, for illustrative purposes. Because the current value of RowSum0 (i.e., the sum of test vector values V00 to V05, which in this example is 15) is less than row constraint RowSumMin, row ROW0 is determined to be non-compliant (NO branch from decision block 133A, FIG. 5). FIG. 6B depicts the random selection of element E00, which is disposed in row ROW0 along with elements E01 to E05, per block 134A of FIG. 5, and also indicates the incremental increase of test vector value V00 to "1" (i.e., from "0", as indicated in FIG. 6A), per blocks 135A and 136A of FIG. 5. FIG. 6B also depicts the subsequent update of row-sum value RowSum0 to 16 in accordance with the incremental increase of test vector value V00, and the optional updates of associated column-sum value ColSum0 and diagonal-sum value DSum21, which are also affected by the incremental increase of test vector value V00. FIG. 6C depicts the subsequent determination that the updated row-sum value RowSum0 falls within the valid range established by row constraints RowSumMin and RowSumMax (YES branch from block 133A in FIG. 5), thereby completing the first pass and passing control back to block 132A for selection of the next sequential row.

FIG. 7 is a simplified diagram depicting a portion of array 200 including middle row ROW1 during a second pass through the loop formed by blocks 132A to 138A in FIG. 5, and illustrates an example of a row that is compliant based on initially assigned test vector values. That is, row ROW1 is identified as a compliant row by way of determining that row-sum value RowSum1 (i.e., the sum of test vector values V10 to V15, which in this example is 27) is within the valid range defined between row constraints RowSumMin (16) and RowSumMax (30). Because the initial row-sum value RowSum1 falls within the established valid range (YES branch from block 133A in FIG. 5), control again passes to block 132A.

FIGS. 8A to 8E depict a third pass through the loop formed by blocks 132A to 138A in FIG. 5, and illustrates an example in which multiple test vector values of a non-compliant row (i.e., row ROW2) are decreased in order to achieve compliance with all row constraints. FIG. 8A depicts the selection of row ROW2 as the current row, and is identified as being non-compliant by way of determining that row-sum value RowSum2 (i.e., the sum of test vector values V20 to V25, which in this example is 39) is greater than row constraint RowSumMax (30). Because the current value of RowSum2 is greater than row constraint RowSumMax, control passes along the YES branch from decision block 133A to block 137A (see FIG. 5). FIG. 8B depicts the random selection of element E24, and also indicates a decrease of test vector value V24 from "8" to "0" (note that for brevity the predetermined amount by which each test vector value may be changed is not limited to an incremental amount, and that the revised value of test vector value V24 is within the valid range of zero to nine). FIG. 8B also depicts the subsequent update of row-sum value RowSum2 to 31 in accordance with the decreased value of test vector value V24, and optional updates of associated column-sum value ColSum4 and diagonal-sum values DSum24 and DSum16. FIG. 8C depicts the subsequent return to block 133A, and a determination that the updated row-sum value RowSum2 still falls outside the valid range established by row constraints RowSumMin and RowSumMax, thereby initiating a second iteration (NO branch from block 133A in FIG. 5). Because the current value of RowSum2 (i.e., 31) is still greater than row constraint RowSumMax, control passes along the YES branch from decision block 133A to block 137A (see FIG. 5). As indicated in FIG. 8D, element E25 is randomly selected during this iteration, and test vector value V25 is incrementally decreased from "9" to "8", whereby row-sum value RowSum2 is subsequently updated to 30, and optional updates of associated column-sum value ColSum5 and diagonal-sum value DSum25. FIG. 8E depicts the subsequent return to block 133A, and a determination that the updated row-sum value RowSum2 now complies with all row constraints, thereby completing the third pass, whereby control passes to block 139A. Because all three rows of array 300A have now been processed, control passes along the YES branch from block 139A to block 140 (FIG. 1).

Referring briefly to FIG. 1, constraint solver 100 is configured to perform the second revision phase 140 of the modified relaxation process only after the first revision phase 130 has been successfully completed (i.e., when the array is revised to comply with all first-dimension constraints, but has not yet been revised to comply with one or more second-dimension constraints). The second revision phase of the modified relaxation process will now be described in additional detail with reference to an exemplary specific embodiment set forth in FIGS. 9 and 9A, and with reference to various examples described with reference to FIGS. 10 through 21. Although these exemplary embodiments and examples disclose beneficial features and aspects of the modified relaxation method, those skilled in the art will understand that modifications to the exemplary embodiments (e.g., the order, number and specific details of the processes used to identify and revise current elements) may altered without departing from the spirit and scope of the present invention.

Figure 9:
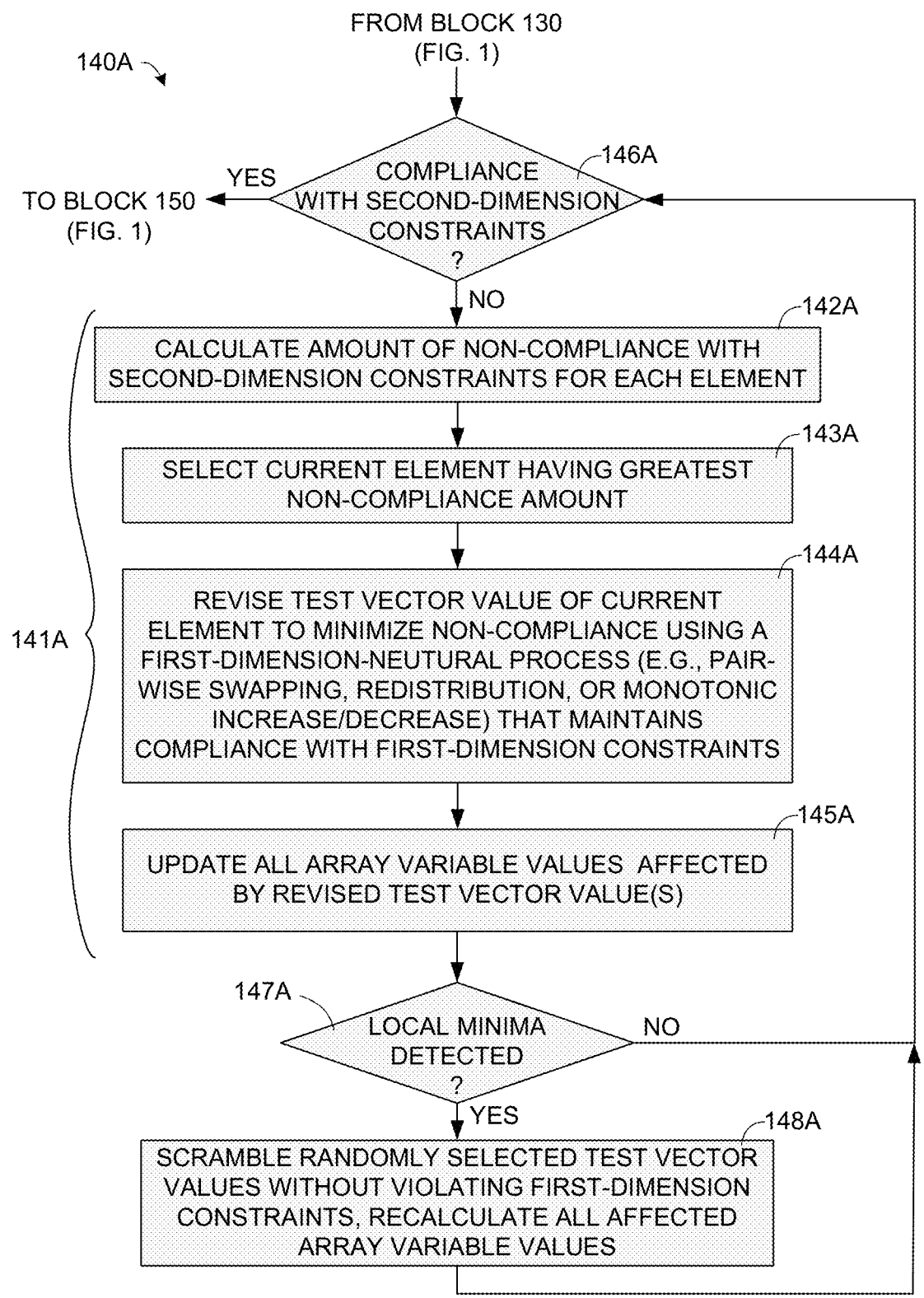
FIG. 9 is a flow diagram depicting a second revision phase process performed by the multi-dimensional constraint solver of FIG. 1 during the stimulus stream generation process according to a specific embodiment of the present invention.

FIG. 9 is a flow diagram functionally depicting an exemplary second revision phase 140A performed by multi-dimensional constraint solver 100 (FIG. 1), where second revision phase 140A includes an identify/revise process group 141A that perform the identification and revision functions generally described above with reference to block 141 of FIG. 1, and decision block 146A that functions to repeat process group 141A until the subject array complies with all multi-dimensional constraints. That is, control passes along the NO branch from block 146A to process group 141A when the subject array is non-compliant with at least one second dimension constraint, and control passes along the YES branch to block 150 (FIG. 1) when the second revision phase is completed (i.e., when the array complies with all multi-dimensional constraints). Each execution of process group 141A is referred to below as a cycle, with a current element selected at the beginning of each cycle based on non-compliance amounts that are recalculated either beginning of each cycle or at the end of the previous cycle, and based on revisions to the array's test vector values entered in the previous cycle. In one embodiment, compliance of the subject array to a designated set of multi-dimensional constraints (block 146A) is determined using non-compliance amounts that are calculated for each element using methods described below, where non-compliance is determined when the calculated non-compliance amount for at least one element is non-zero, and compliance of the subject array is determined by verifying that the non-compliance amount calculated for every element of the subject array is zero.

Referring to the upper portion of FIG. 9, each cycle of the second revision phase (i.e., each execution of group 141A) begins by identifying a current element for revision during the current cycle, which in the exemplary embodiment involves calculating an associated non-compliance amount for each element of the subject array (block 142A), then selecting a current element (i.e., an element of the array to be revised during the current cycle) by identifying the element having the greatest calculated non-compliance amount, where the calculated non-compliance amount for each element indicates that element's relative impact on non-compliance of the array to multi-dimensional constraints (block 143A). After selecting a current element for revision at the beginning of a given cycle, process group 141A then functions to revise the test vector value of the current element to minimize (i.e., reduce as much as possible) the array's non-compliance by performing a first-dimension-neutral operation (e.g., using one of the pair-wise swapping, redistribution, or monotonic increase/decrease operations, which are described below) that functions to maintain compliance of the array with first-dimension constraints (block 144A). In the exemplary embodiment, all array variables used to calculate non-compliance amounts are updated (block 145A) at the end of each cycle (i.e., after the array is modified to include the current element's revised test vector value and an optional revision to the test vector value of a second element in accordance with the first-dimension-neutral process), and then control is returned to block 146A to determine if the revisions entered in the just-completed cycle place the array in compliance with all multi-dimensional constraints.

As used herein, the phrases "impact on non-compliance" and "calculation of non-compliance amount(s)" (see block 140 in FIG. 1 and block 142A in FIG. 9) are defined as follows. The phrase "impact on non-compliance" refers to quantitatively measured amount by which the test vector value of a given element in an array causes the array to deviate from compliance with a set of constraints. The phrase "non-compliance amount" refers to a numeric value generated by an associated mathematical formula that quantitatively determines an amount by which a given element deviates from one or more selected constraints (e.g., the amount by which a column including the given element exceeds a valid column value established by column constraints). In this context, selecting the current element (block 143A) is determined by comparing the non-compliance amounts calculated for each element of an array, and choosing the element having a calculated associated non-compliance amount that is greater than the non-compliance amounts calculated for all other elements of the array. Those skilled in the art will recognize that the mathematical formulas utilized to calculate non-compliance amounts (block 142A) may differ depending on the particular constraints applied to a subject array. However, once a formula is selected for use in quantifying each test vector value's impact on non-compliance, the identification of a current element for revision during a given cycle is determined solely based on a comparison of the non-compliance amounts generated by the adopted formula. For example, when a particular element has a calculated non-compliance amount of five, and all other elements have calculated non-compliance amounts of four or less, then the particular element is selected as the current element because it has the greatest non-compliance amount, and therefore is deemed to have the greatest impact of the array on non-compliance with the applicable constraints. In one embodiment, when two or more elements have calculated non-compliance amounts equal to the same value (e.g., five) and all other elements have lesser calculated non-compliance amounts (e.g., four or less), then the current element for revision during a given cycle is randomly selected from the set of elements having the greatest non-compliance amount (i.e., five). An exemplary mathematical formula used to identify elements having a greatest impact on non-compliance with column constraints (block 142A) are described below with reference to FIG. 10, where a particular element's non-compliance amount is determined by calculating a difference between the column-sum value of the column in which the particular element is disposed and a valid column-sum value (or range of values) established by the column constraints. Additional exemplary calculation formulas used to determine non-compliance amounts related to both column-sum constraints and diagonal-sum constraints are described below, e.g., with reference to FIG. 15.

Figure 9A:
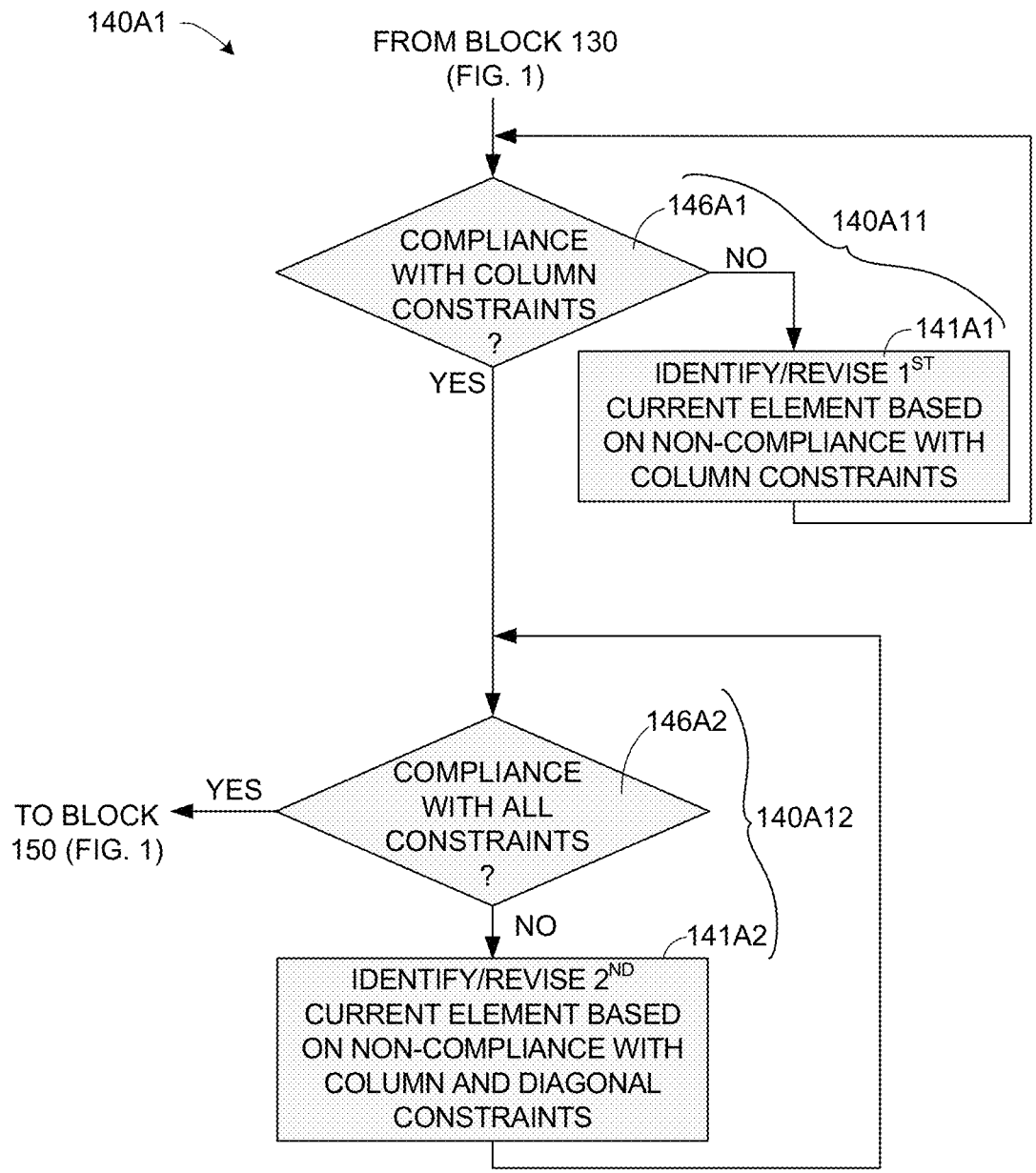
FIG. 9A is a simplified flow diagram depicting another specific embodiment in which the second revision phase process of FIG. 9 is performed using two sub-phases.

Note that execution of second revision phase 140A (FIG. 9) may be varied in accordance with the number of different constraint dimensions. For example, when multi-dimensional constraint solver 100 (FIG. 1) is tasked to generate stimulus streams that are compliant with constraints applying to only two dimensions (e.g., row constraints and column constraints), then the multi-dimensional constraint solver performs first revision phase 130A (FIG. 5) to generate a partial solution that is compliant with the row constraints (e.g., as described above with reference to FIGS. 6A to 8E), and then performs second revision phase process 140A (FIG. 9) to solve for the column constraints as described below with reference to FIGS. 10 to 14B. However, when multi-dimensional constraint solver 100 (FIG. 1) is tasked to generate stimulus streams that are compliant with multi-dimensional constraints including more than two dimensions (e.g., 3D constraints including row constraints, column constraints and diagonal constraints), the multi-dimensional constraint solver performs first revision phase 130A (FIG. 5) as described above, but performs second revision phase 140A using one of two alternative approaches. The first approach involves only calculating non-compliance amounts using both column and diagonal constraints (i.e., performing second revision phase 140A as depicted in FIG. 9 with the second-division constraints including both column and diagonal constraints). The second approach, which is presently preferred, is depicted in FIG. 9A, where a modified second revision phase 140A1 is performed in two sub-phases 140A11 and 140A12, where first sub-phase 140A11 generates a second partial solution that complies with row and column constraints, and then first sub-phase 140A12 generates a final solution that complies with the row, column and diagonal constraints. Specifically, first sub-phase 140A11 is performed starting with the first partial solution generated by the first revision phase process, and involves performing a number of cycles determined by decision block 146A1, where each cycle includes identifying and revising first current elements based on non-compliance with the column constraints (block 141A1, which corresponds to process group 141A of FIG. 9). The example described below with reference to FIGS. 10 to 14B is consistent with the performance of first sub-phase 140A11. After the second partial solution is generated and control passes along the YES branch from decision block 146A1 to decision block 146A2, second sub-phase 140A2 is performed starting with the second partial solution, and involves identifying and revising current second elements based on non-compliance with both the column and diagonal constraints (block 141A2, which corresponds to process group 141A of FIG. 9), and continues until the array complies with all three constraint types. The example described below with reference to FIGS. 15 to 21 is consistent with the performance of second sub-phase 140A12.

Second revision phase 140A (FIG. 9) will now be described with reference to simplified exemplary embodiments depicted in FIGS. 10 to 21. For descriptive purposes, the exemplary embodiments refer to row constraints as first-dimension constraints, and refer to one or both of the column constraints and diagonal constraints as second-dimension constraints for consistency with the examples provided above pertaining to the first revision phase. FIGS. 10-14B depict the execution of second revision phase 140A (FIG. 9) in which the second-dimension constraints include only column constraints, whereby the solution shown in FIG. 14B represents either a final solution for a 2D problem (i.e., where the multi-dimensional constraints include only the row and column constraints set forth above), or a (second) partial solution generated by first sub-phase 140A11 of modified second revision phase 140A1 (FIG. 9A). The example of FIGS. 15-21 depicts the execution of second revision phase 140A using the partial array solution generated at FIG. 14B, whereby FIGS. 15-21 effectively depict second sub-phase 140A12 of FIG. 9A.

FIG. 10 depicts array 300A1 at the beginning of an exemplary second revision phase in continuation of the exemplary first revision phase described above with reference to FIGS. 6A to 8E. That is, array 300A1 represents a (first) partial solution generated by the multi-dimensional constraint solver after successful completion of first revision phase 130A (FIG. 5). In effect, array 300A1 represents an updated version of array 300A (FIG. 4A) including all revisions to the initial test vector values of selected elements that are described above with reference to FIGS. 6A through 8E (e.g., element E00 includes text vector value V00 equal to one based on the revision described above with reference to FIG. 6B), and all remaining (non-revised) elements have the initial test vector values that were assigned as described above with reference to FIG. 4A.

FIG. 10 also shows array variables ColSum0 to ColSum5 including column-sum values that have been calculated using test vector values V00 to V25 of array 300A1. For example, array variable ColSum0 has a column-sum value of seven, which is calculated by adding test vector variables V00 (1) of element E00, V10 (2) of element E10, and V20 (4) of element E20, where elements E00, E10 and E20 collectively form column COL1. Similarly, the column-sum values indicated in FIG. 10 are generated for each array variable ColSum1 to ColSum5 by adding the test vector values of the elements forming each column COL2 to COL5.

The first cycle of the second revision phase begins by identifying a current element from elements E00 to E25 having a greatest impact on the non-compliance of array 300A1 to the applicable multi-dimensional constraints. As set forth above, for purposes of discussion the applicable multi-dimensional constraints used in the exemplary embodiment of FIG. 10 include row constraints and column constraints (i.e., the diagonal constraints are disregarded). Because array 300A1 represents a partial solution that satisfies all row constraints, the current element to be identified during the first cycle is the element having the greatest impact on the column constraints. As explained above with reference to blocks 142A and 143A (FIG. 9), identification of a current element for the current cycle includes calculating a non-compliance amount for each element E00 to E25, and then selecting an element having the greatest calculated non-compliance amount. In the present example, the calculation of non-compliance amounts for each element E00 to E25 involves determining the amount by which the column containing each element is non-compliant with the column constraints. Because the column constraints define a range of valid column-sum values (i.e., the range between ColMin(8) and ColMax(16)), non-compliance of each element is determined by comparing each element's column-sum value with the valid column-sum range. Because the column-sum values ColSum1 to ColSum4 are within the valid column-sum range, columns COL1 to COL4 are compliant, whereby non-compliance amounts N01 to N24 for each element E01 to E24 disposed in columns COL1 to COL4 is set equal to zero (e.g., the non-compliance amount for element E01 is indicated as "N01=0"). Because the column-sum values ColSum0 and ColSum5 are outside of the valid column-sum range, columns COL0 and COL5 are non-compliant, and therefore have non-zero non-compliance amounts. Specifically, non-compliance amounts N00, N10 and N20 of elements E00, E10 and E20 are determined by the amount that ColSum0 of column COL0 deviates (differs) from the valid column-sum range, which in this case is calculated by subtracting ColSum0(7) from ColMin(8), whereby non-compliance amounts N00, N10 and N20 are equal to one (e.g., the non-compliance amount for element E00 is indicated as "N00=1"). Similarly, non-compliance amounts N05, N15 and N25 of elements E00, E10 and E20 are calculated by subtracting ColMax(16) from ColSum5(20), whereby non-compliance amounts N05, N15 and N25 are equal to four (e.g., the non-compliance amount for element E05 is indicated as "N05=4"). These calculated non-compliance amounts represent examples of calculating a difference between column-sum values and at least one valid column-sum value, and are used to quantify the impact of each element in non-compliant rows COL0 and COL5 on non-compliance of array 300A1 with the column constraints, with elements E05, E15 and E25 having the greatest non-compliance amount (i.e., four). Because more than one element has the same greatest non-compliance amount (i.e., N05=4, N15=4 and N25=4), one of elements E05, E15 and E25 is randomly selected for revision, which in the example depicted in FIG. 10 as element E25 (i.e., as indicated by the thicker border surrounding element E25). Accordingly, the example continues with element E25 is selected as the current element for revision during the first cycle of the second revision phase.

FIGS. 11A to 11C and FIGS. 12A and 12B depict revisions of current element E25 using alternative first-dimension-neutral operations during the first cycle of the second revision phase according to the exemplary embodiment established above with reference to FIG. 10. As noted above, first-dimension-neutral operations are utilized to regulate revisions to a selected current element without violating any row constraints. Accordingly, for clarity, FIGS. 11A to 12B only show relevant portions of array 300A1 that are affected by the corresponding revision to current element E25, which in this case includes the elements that form column COL5 and the elements form row ROW2.

Referring to FIG. 11A, elements E20 to E25 are modified to include exemplary values that are calculated or otherwise utilized during pair-wise swapping and redistribution operations, which represent two types of first-dimension neutral (i.e., row-neutral) operations. The first value utilized during these operations is a second-dimension minimum change amount M25, which is depicted below test vector value V25 and, in the current example, has the same calculated value (i.e., four) as that of non-compliance amount N25, which is described above for FIG. 10. Minimum change amount M25 represents a minimum amount by which test vector value V25 of current element E25 could be changed in order to eliminate all applicable non-compliances with second-dimension (i.e., in this case, column) constraints. Stated differently, minimum change amount M25 represents the minimum amount by which test vector value V25 would have to be decreased in order for column COL5 to achieve compliance with the column constraints (i.e., reducing ColSum5 from twenty to sixteen would eliminate the non-compliance of column COL5). In some embodiments, non-compliance amount N25 may be calculated in a way that allows it to serve as minimum change amount M25 to reduce memory and processing requirements. The second values utilized during these operations are post-revision non-compliance values, which are calculated for each of remaining same-row elements E20 to E24 (i.e., other elements forming row ROW2), and which are indicated parenthesis below test vector values V20 to V24. Each of these calculated post-revision non-compliance values is proportional to the number of non-compliances to the column constraints generated in array 300A1 if the associated same-row element were changed by a (second) amount that is opposite to minimum change (first) amount. That is, because test vector value V25 must be decreased by four to eliminate the non-compliance of column C5, one other test vector value V20 to V25 must be selected for an increase by four (i.e., the opposite of the amount added to test vector value V25, whereby a sum of the two amounts is zero). In one embodiment, calculation of the post-revision non-compliance values for test vector value V20 to V25 involves determining if a reduction by four would increase, decrease or have no change on the number of non-compliances with the column constraints. For example, adding four to element E20 would cause column-sum ColSum0 to increase from seven (which is non-compliant) to eleven (which is compliant), whereby the total number of non-compliances of array 300A1 would reduce by one (indicated by the post-revision non-compliance value "[−1]" below test vector value V20 in FIG. 11A). Similarly, adding four to element E23 would cause column-sum ColSum3 to increase from fifteen (which is compliant) to nineteen (which is non-compliant), whereby the total number of non-compliances of array 300A1 would increase by one (indicated by the post-revision non-compliance value "[+1]" below test vector value V23 in FIG. 11A). As indicated by the post-revision non-compliance values "[0]" provided in the remaining same-row elements, the addition of four to each associated test vector value by four would neither increase nor decrease the amount of non-compliance of the associated columns. In one embodiment, the same-row element is selected based on the calculated post-revision non-compliance value that indicates a greatest reduction in the amount of non-compliance of array 300A1 to the column constraints, which in this example would be element E20.

FIG. 11B depicts an exemplary pair-wise swapping operation in which test vector value V25 of current element E25 is swapped (exchanged) with test vector value V20 stored in selected same-row element E20, whereby test vector value V25 is effectively reduced by four (i.e., from "V25=8" in FIG. 10 to "V25=4" in FIG. 11B), and test vector value V20 is increased by four (i.e., from "V20=4" in FIG. 10 to "V20=8" in FIG. 11B). As a result of this pair-wise swapping operation, the amount of non-compliance of array 300A1 to column constraints is reduced by way of eliminating the non-compliance of column COL5, and further by way of eliminating the non-compliance of column COL0.

FIG. 11C depicts an exemplary redistribution operation in which test vector value V25 of current element E25 is reduced (changed) by four (first amount), and test vector value V24 of current element E24 is increased (changed) by four (i.e., a second amount opposite to the first amount). For illustrative purpose element E24 is utilized to demonstrate redistribution in order to avoid confusion with pair-wise swapping. As a result of this redistribution, test vector value V25 is changed from "V25=8" (FIG. 10) to "V25=4" (FIG. 11C), and test vector value V24 is increased from "V24=0" (FIG. 10) to "V24=4" (FIG. 11C). As a result of this redistribution operation, the amount of non-compliance of array 300A1 to column constraints is reduced by way of eliminating the non-compliance of column COL5.

FIGS. 12A and 12B depict an exemplary monotonic increase/decrease operation, which represents a third type of first-dimension-neutral (e.g., row-constraint-neutral) operation. Monotonic increase/decrease operations facilitate reducing non-compliance of array 300A1 with respect to column (first-dimension) constraints by changing the test vector value of the current element by the lesser of (i) the current element's second-dimension minimum change amount, and (ii) a slack amount by which the current element can be changed without generating non-compliance with the row (i.e., first-dimension) constraints. Referring to FIG. 12A, minimum change amount M25=4, which was calculated as set forth above, is copied below test vector value V25 of current element E25. FIG. 12A also indicates the calculation of a slack value ROWSLACK2 for row ROW2, which determines the amount by which row ROW2 (i.e., the row containing current element E25) may be reduced without causing row ROW2 to become non-compliant with the row constraints. In this example, the calculation involves subtracting RowSumMin(16) from RowSum2(30). The calculated slack value ROWSLACK2 (i.e., fourteen) effectively indicates that test vector value V25 may be monotonically decreased as much as fourteen without causing row ROW2 to become non-compliant. FIG. 12B indicates a change to test vector value V25 of current element E25 by the minimum change amount M25(4), which in this example represents the lesser of minimum change amount M25 and the calculated row-slack value ROWSLACK2(14). An advantage of monotonic increase/decrease operations is that this approach minimizes the generation of new non-compliances in other columns, which may facilitate convergence in fewer cycles than the pair-wise swapping or redistribution approaches.

FIG. 13 depicts array 300A2 at the beginning of a second cycle of the second revision phase using the revisions described above with reference to FIG. 12D. That is, array 300A2 includes test vector values that differ from array 300A1 (FIG. 10) only in that test vector value V25 is reduced by four, whereby the only remaining non-complaint column in array 300A2 is column COL0. The non-compliance amount of elements E00, E10 and E20 is calculated as explained above, and indicated in FIG. 13 by way of non-compliance values N00=1, N10=1 and N20=1, which represent greatest non-compliance amounts for array 300A2. As set forth above, because elements E00, E10 and E20 include common (i.e., the same) non-compliance amounts, one of elements E00, E10 and E20 must be selected as the current element for revision.

FIGS. 14A and 14B depicts a relevant portion of array 300A2 (FIG. 13) associated with the revision of randomly selected current element E00 using the monotonic change operation. In this case, the non-compliance amount associated with the monotonic revision of selected current element E00 is represented by minimum change amount M00=1, and the corresponding column-sum ColSum0=7 is one less than the valid column-sum range determined by the column constraints (i.e., because minimum column-sum value ColSumMIN is set at eight). Accordingly, test vector value V00 must be increased by one to eliminate the non-compliance of column COL0. FIG. 14A depicts the calculation of row-slack value RO9WSLACK0 using the method described above with reference to FIG. 12A, where in this case row-slack value RO9WSLACK0 is calculated for the amount that row-sum value RowSum0 may be increased without causing row ROW0 to violate the existing row constraints. As indicated, the difference between RowSumMAX(30) and RowSum0(16) yields a row-slack value RO9WSLACK0 of fourteen. Because the minimum cAs indicated in FIG. 14B, the monotonic increase operation therefore causes test vector value V00 to increase from one to two (i.e., without requiring changes to any other element in row ROW0), whereby column-sum value ColSum0 is increased from seven to eight, and row-sum value RowSum0 increases from 16 to 17. Accordingly, the depicted monotonic increase operation eliminates the last remaining non-compliance of array 300A2 with respect to the column constraints without creating a violation of any row constraints.

Second revision phase 140A (FIG. 9) will now be described with reference to FIGS. 15-21 in which current elements are identified for revision based on non-compliance with both column and diagonal constraints. That is, the example described above with reference to FIGS. 10-14B addresses a 2D problem in which row and column constraints are applicable. The examples described below with reference to FIGS. 15-21 address a 3D problem in which row, column and diagonal constraints are applicable. The processed described with reference to FIGS. 15-21 corresponds to second sub-phase 140A2 of FIG. 9A, but may also be used to revise an array including non-compliances with both column and diagonal constraints.

Figures 15, 16A, 16B:
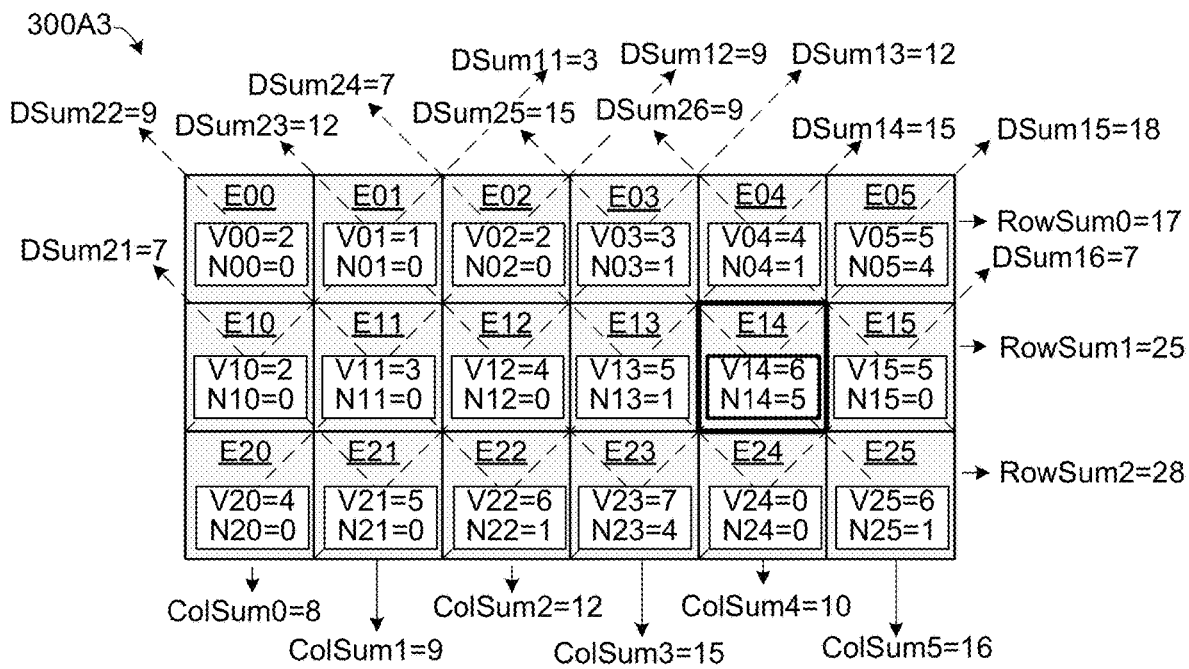
FIG. 15 depicts revised array prior to performing a second sub-phase of second revision phase processing involving 3D constraints using the process of FIG. 9.
FIGS. 16A and 16B depict revising the identified first element of the array of FIG. 15 during a first cycle of the second sub-phase using a pair-wise swapping operation.

FIG. 15 shows an array 300A3 at the beginning of an exemplary second sub-phase of a second revision phase in continuation of the exemplary first sub-phase described above with reference to FIGS. 10 to 14B. That is, array 300A3 represents a (second) partial solution generated by the multi-dimensional constraint solver after successful completion of first sub-phase 140A1 (FIG. 9A). In effect, array 300A3 represents an updated version of array 300A1 (FIG. 10) including all revisions described above with reference to FIGS. 11A through 14B. FIG. 15 also shows the various column-sum and diagonal-sum values, which are calculated as described above using test vector values V00 to V25 that are stored in elements E00 to E25 of array 300A3.

The first cycle of the second sub-phase begins by identifying a current element from elements E00 to E25 having a greatest impact on the non-compliance of array 300A3 to the column and diagonal constraints (i.e., the applicable second-dimension constraints). Because array 300A3 represents a second partial solution that satisfies all row constraints and all column constraints, the current element to be identified during the first cycle is the element having the greatest impact on diagonal constraints. As explained above with reference to blocks 142A and 143A (FIG. 9), identification of a current element for the current cycle includes calculating a non-compliance amount for each element E00 to E25, and then selecting an element having the greatest calculated non-compliance amount. In the present example, the calculation of non-compliance amounts for a given element E00 to E25 involves determining the amount by which the diagonal series intersecting the given element are non-compliant with the diagonal constraints, and adding the diagonal-sum non-compliance with any column non-compliance of the column in which the given element is included. Note that, because all column constraints are removed in array 300A3 at the beginning of the second sub-phase, the non-compliance amounts calculated for each element E00 to E25 effectively only includes the diagonal-sum non-compliance amounts. Also, because the diagonal constraints define a range of valid diagonal-sum values (i.e., the range between DMin(=3) and DMax(=14)), non-compliance amount of each element is determined by adding differences between the diagonal-sum values of each diagonal series intersecting each element and the valid diagonal-sum range. Referring to the diagonal-sums listed in FIG. 15, the three diagonal-sums that exceed the valid diagonal-sum range include DSum14, DSum15 and DSum24, with the remaining diagonal-sums being in the valid diagonal-sum range of three to fourteen. Accordingly, the non-compliance amount of each element that is intersected by one of non-compliant diagonals DSum14, DSum15 and DSum24 is calculated by adding the non-compliance amounts of each intersecting non-compliant diagonal. For example, element E03 is intersected by compliant diagonal-sum DSum12 and non-compliant diagonal-sum DSum25, which exceeds the valid diagonal-sum range by one, whereby non-complaint amount N03 is set at one (i.e., N03=1). Similarly, element E14 is intersected by non-compliant diagonal-sum DSum15, which exceeds the valid diagonal-sum range by four, and non-compliant diagonal-sum DSum25, which exceeds the valid diagonal-sum range by one, whereby non-complaint amount N25 is set at five (i.e., N15=5). As set forth above, non-compliance amounts N00 to N25 are used to quantify the impact of each element on non-compliance of array 300A3 with the diagonal constraints, with elements E14 having the greatest non-compliance amount (i.e., five). Accordingly, the exemplary second sub-phase continues below with reference to FIG. 16A using element E14 as the selected current element for revision. In other embodiments, non-compliance amounts may be determined based on the number of non-compliant diagonal series or columns interesting a given element (e.g., as used in the N-Queens example described below with reference to FIGS. 22-24).

FIGS. 16A and 16B depict a portion of array 300A3 (FIG. 15), and more particularly the revision of current element E14 during a first cycle of the second sub-phase using a pair-wise swapping operation. Referring to current element E14 in FIG. 16A, minimum change amount M14 is calculated as being equal to four, which represents the minimum number that could be subtracted to test vector value V14 in order to eliminate the non-compliances associated with both diagonal-sums DSum15 and DSum24 (that is, if test vector value V14 were decreased from its current value of six to a revised value of two, then both non-compliances would be eliminated). Referring to elements E10 to E13 and E15 in FIG. 16A, post-revision non-compliance values for each element are indicated in brackets below each corresponding test vector value V10 to V13 and V15, where each post-revision non-compliance value indicates the relative number of non-compliances with the column and diagonal constraints (i.e., the applicable second-dimension constraints) that would be created by changing the corresponding test vector value by an amount opposite to minimum change amount M14 (i.e., by increasing each test vector value by four). For example, increasing test vector value V12 of element E12 from 4 to eight would generate three non-compliances: column-sum ColSum2 would be caused to exceed ColSumMAX, diagonal-sum DSum13 would be caused to exceed DSumMAX, and diagonal-sum DSum23 would be caused to exceed DSumMAX. In this example, same-row elements E10 and E11 have equal post-revision non-compliance values (zero) that represent the greatest reduction in non-compliance of array 300A3 to the column and diagonal constraints, and as such one of these two elements is randomly selected for pair-wise swapping. As indicated in FIG. 16B, test vector value V10 of selected same-row element E10 is swapped with test vector value E14, whereby test vector value V10 is revised to equal two. Accordingly, the depicted pair-wise swapping operation eliminated the non-compliances of diagonal-sums DSum14 and DSum25 with the diagonal constraints without causing corresponding row ROW1 to violation of any row constraints.

FIG. 17 depicts array 300A4 at the beginning of a second cycle of the second sub-phase using the revisions described above with reference to FIG. 16B. That is, array 300A4 includes test vector values that differ from array 300A3 (FIG. 15) in that test vector value V14 is reduced by four and test vector value V10 is increased by four. These revisions reduced the non-compliance amount of element E14 from five (as indicated by "N14=5" in FIG. 15) to two (as indicated by "N14=2" in FIG. 17). However, these revisions did not entirely eliminate the non-compliance of the diagonal section indicated by DSum14, which requires a reduction of one from one of test vector values V22, V13 or V04 to achieve compliance with the diagonal constraints. In addition, the reduction of test vector value V14 generated a new non-compliance in column COL4, which requires an increase of two in one or more of test vector values V04, V13 or V24. Revised non-compliance amounts calculated for array 300A4 are indicated in FIG. 17, with the non-compliance amount for element E04 (i.e., N04=1) being calculated by combining decrease of one associated with diagonal-sum DSum14 and the increase of two required for column COL4, whereby elements E14 and E24 have equal greatest non-compliance amounts (i.e., N14=2 and N24=2). As set forth above, because elements E14 and E24 have equal greatest non-compliance amounts, one of elements E14 and E24 must be selected as the current element for revision during the second cycle.

FIGS. 18A and 18B depict the revision of randomly selected element E24 using the redistribution operation described above. Referring to current element E24 in FIG. 18A, which shows row ROW2 of array 300E4, minimum change amount M24 is calculated as being equal to two (i.e., "M24=2"), which represents the minimum number that could be subtracted to test vector value V24 in order to eliminate the non-compliances associated with column-sum ColSum4 (that is, if test vector value V24 were increased from its current value of zero to a revised value of two, then the non-compliance of column COL4 would be eliminated). Referring to elements E20 to E23 and E25 in FIG. 18A, post-revision non-compliance values for each element are indicated in brackets below each corresponding test vector value V20 to V23 and V25, where each post-revision non-compliance value indicates the relative number of non-compliances with the column and diagonal constraints (i.e., the applicable second-dimension constraints) that would be created by changing the corresponding test vector value by an amount opposite to minimum change amount M24 (i.e., by decreasing each test vector value by two). As indicated in FIG. 18B, element E25 is randomly selected from the group of elements having post-revision non-compliance values equal to zero, and used as a same-row element for a redistribution operation in which test vector value V24 is increased from zero to two, and test vector value V25 is concomitantly reduced from six to four. Accordingly, the depicted redistribution operation eliminated the non-compliance of column COL4 with the column constraints without causing corresponding row ROW2 to violation of any row constraints.

FIG. 19 depicts array 300A5 at the beginning of a third cycle of the second sub-phase using the revisions described above with reference to FIG. 18B. That is, array 300A5 includes test vector values that differ from array 300A4 (FIG. 17) in that test vector value V25 is reduced by two and test vector value V24 is increased by two, whereby the only remaining non-complaint diagonal in array 300A5 is indicated by DSum14=15. The non-compliance amount of elements E22, E13 and E04 is calculated as explained above, and indicated in FIG. 19 by way of non-compliance values N22=1, N13=1 and N04=1. As set forth above, because elements E22, E13 and E04 include equal greatest non-compliance amounts, one of elements E22, E13 and E04 must be selected as the current element for revision.

FIGS. 20A and 20B depict the revision of randomly selected element E22 using the monotonic decrease operation described above. FIG. 20A depicts the calculation of minimum change amount M22 (=1) for current element E22 (i.e., "M22=1"), and row-slack value RO9WSLACK2 (=2), which indicates that test vector value V22 may be monotonically decreased by as much as two without causing row ROW2 to become non-compliant. As indicated in FIG. 20B, because minimum change amount M22 is less than row-slack value RO9WSLACK2, test vector value V22 is monotonically decreased from six to five, whereby diagonal-sum value DSum14 is decreased from 15 to 14, which eliminates the corresponding diagonal-sum non-compliance without generating any new column-sum or row-sum non-compliances. Accordingly, the depicted monotonic decrease operation eliminated the last remaining non-compliance without creating any new non-compliances.

Figure 21:
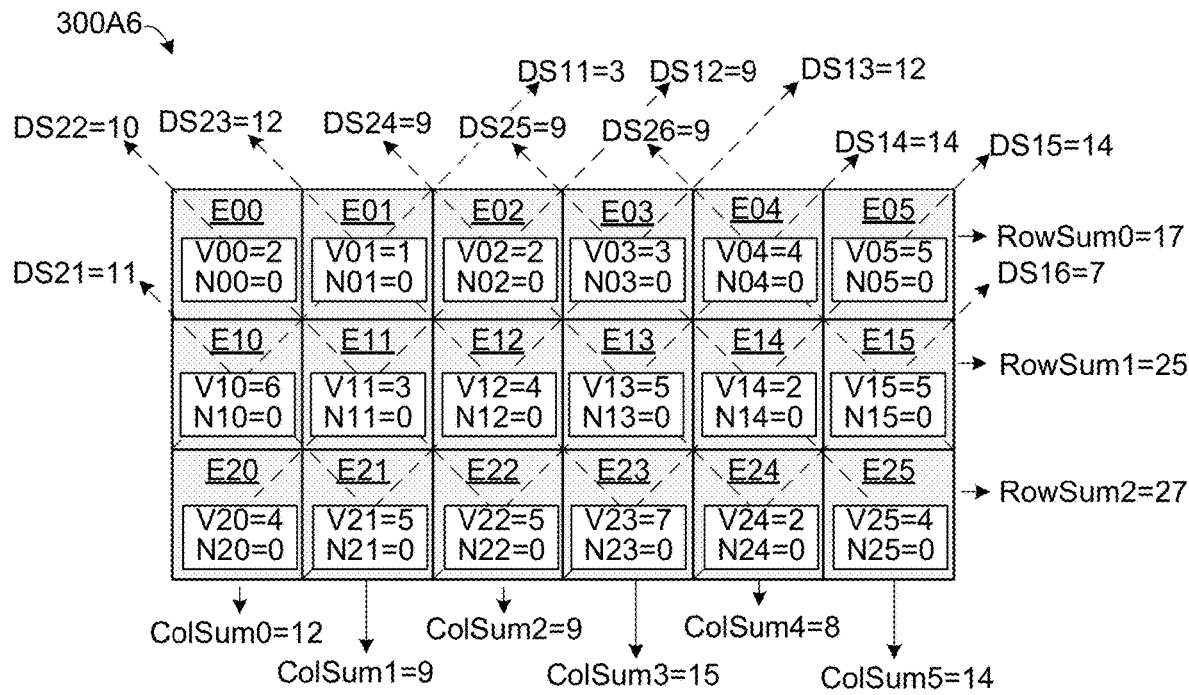
FIG. 21 depicts a revised version of the array of FIG. 10 after successfully completing the second revision phase, whereby the revised array is in compliance with the 3D constraints.

FIG. 21 depicts stimulus stream array 300A6 after all row, column and diagonal sums have been updated following the revision of element E22 (discussed above with reference to FIG. 20B), and control again returns to decision block 145A (see top of FIG. 9). At this point, all row-sum values ROWSUM0 to ROWSUM2, all column sums COLSUM0 to COLSUM5, and all diagonal sums DS11 to DS17 and DS21 to DS27 are in compliance with all row, column and diagonal constraints. That is, multi-dimensional constraint solver 100 has now revised array 300A6 such that it complies with all multi-dimensional constraints, which is indicated in FIG. 21 by the "0" non-compliance values N00 to N25 listed in elements E00 to E25. Accordingly, control passes along the YES branch from decision block 145A (see top of FIG. 9) to block 150 for subsequent processing as described above with reference to FIG. 1.

Additional features and beneficial aspects of the multi-dimensional constraint solver will now be described with reference to the well-known N-Queens problem. The N-Queens problem is generally described as follows: given n randomly positioned Queens on an n-by-n chessboard, move the Queens into positions in which no two Queens are in position to attach each other. Stated differently, each valid solution to the N-Queens problem requires a number "n" of Queens positioned in an n-by-n array of chessboard squares such that each row and column of the n-by-n array includes only one Queen, and each diagonal series of squares of the n-by-n array includes at most one Queen (i.e., zero Queens or one Queen). The N-Queens problem presents a well-known multi-dimensional constraint problem that provides a suitable benchmark for comparing the method utilized by the multi-dimensional constraint solver of the present invention with conventional constraint solvers.

Figure 22:
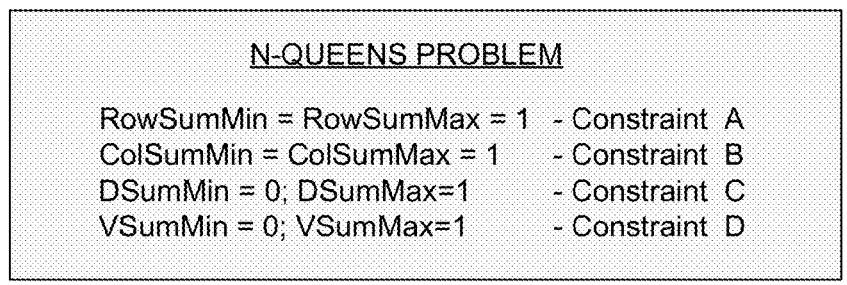
FIG. 22 depicts specific variable and constraint values associated with an eight row N-Queens problem, which represents a specific three-dimensional solvable by the multi-dimensional constraint solver according to another exemplary embodiment of the present invention.

FIG. 22 includes a table of global variable and constraint values that configure the multi-dimensional constraint solver of the present invention to generate solutions to the N-Queens problem. That is, the global variables and constraints described above with reference to FIG. 2 that are applicable to a 3D constraint problem may be used to generate a number of solutions to the N-Queens by way of setting the global variable and constraints using the parameter values indicated in FIG. 22. Specifically, FIG. 22 establishes that each row and each column must include one and only one Queen (i.e., RowSumMin and RowSumMax both equal one, as indicated by Constraints A, and ColSumMin and ColSumMax both equal one, as indicated by Constraints B), and each diagonal must include one Queen or zero Queens (i.e., DSumMin equals zero and DSumMax equals one, as indicated by Constraints C). In this case, the presence of a Queen in a given element is designated by assigning a unit test vector value (i.e., one) to the given element, and the absence of a Queen in a given element is designated by assigning a null test vector value (i.e., zero).

This convention is designated by setting the range of valid test vector values to either zero or none (i.e., VMin=0 and VMax=1, as indicated by Constraints D). Using these parameters, the methods described above with reference to FIG. 1 may be used to generate N-Queens solutions for any number "n".

The method will now be described with reference to generating solutions to an eight-Queens problem (i.e., eight Queens positioned on an eight-by-eight array in a pattern that satisfies the above-mentioned row, column and diagonal constraints). First, the multi-dimensional constraint solver generates an initial eight-by-eight array in which each element is randomly assigned a test vector value of one or zero. The array is then revised utilizing first revision phase 130A described above with reference to FIG. 5, where selected elements in rows having more than one Queen are revised from one to zero until every row has only one Queen, thereby generating a first partial solution that satisfies the row constraints. In one embodiment, the second revision phase is performed in accordance with FIG. 9A, with the first sub-phase being performed to generate a second partial solution that satisfies both the row and column constraints, and then the second sub-phase described above with reference to FIG. 9A is performed to generate a final solution that satisfies all constraints. In another embodiment, the second revision phase is performed in a single phase, solving both column and diagonal constraints simultaneously. In either case, the second revision phase can be described with reference to the eight-Queens problem as follows: identify a Queen to be moved (revised) based on a greatest number of calculated conflicts, and move the Queen to a row location that produces a minimum number of conflicts. Calculation of conflicts is performed in a manner similar to that described above with reference to the generation of non-compliance amounts for general arrays, with the number of conflicts for a given Queen being determined by the number of other Queens positioned in the column or any diagonal series in which the given Queen is located. FIG. 23 shows a simple example in which the randomly placed Queens generate conflicts indicated by dashed-line arrows, where the number of conflicts (i.e., the non-compliance amount) for each Queen is indicated in parentheses next to each Queen Q. In this example, the two Queens in the two lower rows each have two conflicts (non-compliances), with the Queen in the lowermost row having two diagonal-sum non-compliances and the Queen in the next row up having one diagonal-sum non-compliance and one column-sum non-compliance. As set forth above, one of the two Queens having this greatest non-compliance amount is randomly selected (e.g., the Queen indicated by the circle in FIG. 23) as the "current" Queen to be moved (revised), whereby the selected Queen is analogous to the "current element" selected for revision in the general array examples provided above. FIG. 24 shows exemplary calculations of post-revision non-compliance values associated with the number of conflicts (non-compliances) that would be produced by moving the selected Queen into each of the associated squares (element), with the non-compliances associated with each row position indicated by dash-line arrows. Because the square located directly to the right of the selected Queen has the post-revision non-compliance value that creates the lowest number of additional conflicts (i.e., zero), the selected Queen is then moved into the associated square as indicated by the arrow. The process shown in FIGS. 23 and 24 is then repeated until all conflicts have been eliminated, whereby a solution is generated in which each row and each column includes one and only one Queen, and each diagonal series includes zero or one Queen.

Although the N-Queens solution method described above is capable of finding multiple valid solutions to the N-Queens problems in a short amount of time, the method does not always generate a solution. That is, the method can sometimes encounter a local minima, which occurs when a Queen continues to move cyclically between locations in type of infinite loop. Referring again to FIG. 9, when a local minima situation is detected (YES branch from decision block 147A), for example, when the number of cycles exceeds a predetermined max-count value, control passes to block 148A, where randomly selected test vector values are scrambled in each row (i.e., without violating row constraints), and then recalculating all array variable values before returning to block 146A. In the N-Queens problem, detection of each local minima may be addressed by re-positioning a selected percentage of the Queens, and randomly repositioning each selected Queen into a different element/square in the same row.

FIG. 25 is table comparing the amount of time required to generate solutions to selected 2D and 3D (N-Queens) problems using conventional methods and the method described above. Using conventional constraint solvers, all of the listed problems timed out or exceeded available memory capacities (i.e., using timeout in 1000 seconds, and memory-out at 4G), but were solved very quickly using the present invention.

Technology Specific EDA System/Workflow Explanation

Figure 26:
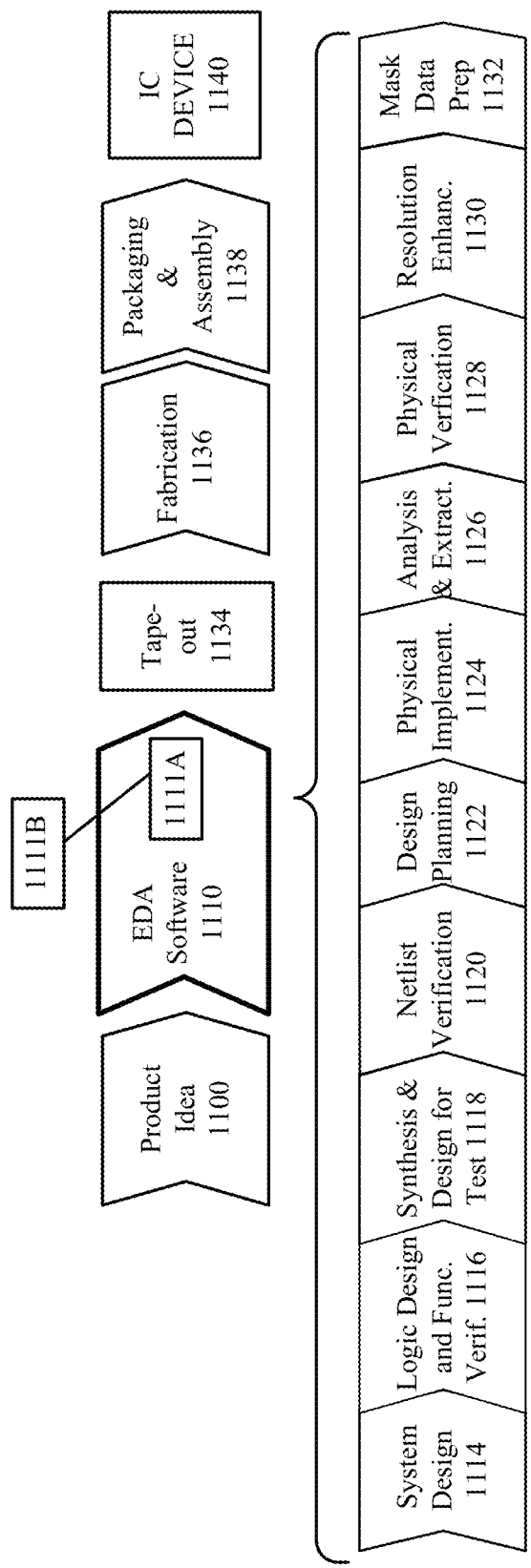
FIG. 26 is a flowchart illustrating various operations in the design and fabrication of an integrated circuit in accordance with an embodiment of the present disclosure.

FIG. 26 illustrates various processes performed in the design and fabrication of IC devices using software tools with a computer to transform data and instructions that represent the associated IC devices. These processes start with the generation of a product idea (1100) with information supplied by one or more circuit designers. The product idea is realized as the evolving circuit design during the circuit design process performed by the circuit designer(s) using EDA software tools (1110). One or more steps of the EDA software design process performed by EDA software tools (1110) is implemented using a computer-readable medium 1111A that is read by a computer 1111B. EDA software tools may also be signified herein using the singular "EDA software tool", as EDA software, or as a design tool. When a circuit design is finalized, it is typically taped-out (1134), and then multiple ICs, each being a physical implementation of the final circuit design, are fabricated on a semiconductor wafer (1136) using a selected technology node. The semiconductor wafer is then diced into individual chips, with each chip including one of the ICs, and then the chips are packaged and assembled using corresponding processes (1138), resulting in finished IC device 1140.

Note that the design process that uses EDA software tools (1112) includes operations 1114-1132, which are described below. This design flow description is for illustration purposes only and is not meant to limit the present disclosure. For example, an actual circuit design may require a circuit designer to perform the design operations in a different sequence than the sequence described herein.

During system design (1114), a circuit designer describes the functionality to be performed by the manufactured IC device. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products. Cells or other descriptions including all relevant information pertaining to the two-part USB PHY configuration of the present invention are typically copied from a library accessible by way of the EDA software tool, and inserted into a circuit design during the system design process.

Then, during logic design and functional verification (1116), VHDL or Verilog code for modules in the circuit is written and the design is checked for functional accuracy. More specifically, the design is checked to ensure that it produces the correct outputs. The VHDL or Verilog code is software comprising optimized readable program instructions adapted for the efficient description of a logic design. Exemplary EDA software products from Synopsys, Inc. of Mountain View, Calif. that can be used at this stage include: VCS, Vera, Designware, Magellan, Formality, ESP and Leda products.

Next, during synthesis and design for test (1118), VHDL/Verilog code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products. In one embodiment, the multi-dimensional constraint solver/method described herein may be utilized to verify netlists generated from early circuit design versions generated during synthesis and design.

Moreover, during netlist verification (1120), the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products. In one embodiment, the multi-dimensional constraint solver/method described herein may be utilized to verify netlists generated from associated circuit design versions during netlist verification.

Furthermore, during design planning (1122), an overall floor plan for the integrated circuit is constructed and analyzed for timing and top-level routing. Exemplary EDA software products from Synopsys, Inc. of Mountain View, Calif. that can be used at this stage include: Astro and IC Compiler products. In one embodiment, the multi-dimensional constraint solver/method described herein may be utilized to verify the circuit design versions generated during design planning.

Additionally, during physical implementation (1124), the placement (positioning of circuit elements such as transistors or capacitors) and routing (connection of the same by a plurality of conductors) occurs. Exemplary EDA software products from Synopsys, Inc. of Mountain View, Calif. that can be used at this stage include: In one embodiment, the multi-dimensional constraint solver/method described herein may be utilized to verify the circuit design versions generated during design planning.

Then, during analysis and extraction (1126), the circuit function is verified at a transistor level, which permits refinement of the logic design. Exemplary EDA software products from Synopsys, Inc. of Mountain View, Calif. that can be used at this stage include: Astrorail, Primerail, Primetime, and Star RC/XT products. In one embodiment, the multi-dimensional constraint solver/method described herein may be utilized to verify circuit design versions generated during analysis and extraction.

Next, during physical verification (1128), the design is checked to ensure correctness for manufacturing issues, electrical issues, lithographic issues, and circuitry. Exemplary EDA software products from Synopsys, Inc. of Mountain View, Calif. that can be used at this stage include the Hercules product.

Moreover, during resolution enhancement (1130), geometric manipulations of the layout are performed to improve manufacturability of the design. Exemplary EDA software products from Synopsys, Inc. of Mountain View, Calif. that can be used at this stage include: Proteus, Proteus, and PSMGED products.

Additionally, during mask-data preparation (1132), the 'tape-out' data for production of masks to produce finished integrated circuits is provided. Exemplary EDA software products from Synopsys, Inc. of Mountain View, Calif. that can be used at this stage include the Cats. family of products.

For all of the above mentioned integrated circuit design tools, similar tools from other EDA vendors, such as Cadence and Mentor Graphics can be used as an alternative. Additionally, similarly non-commercial tools available from universities can be used.

Embodiments of the present disclosure can be used during one or more of the above-described stages. Specifically, some embodiments of the present disclosure can be used in EDA software 1112.

A storage subsystem is preferably used to store the basic programming and data constructs that provide the functionality of some or all of the EDA tools described herein, and tools applied for development of cells for the library and for physical and logical design using the library. These software modules are generally executed by one or more processors in a manner known to those of ordinary skill in the art.

Hardware/Software Equivalence

Certain innovations, embodiments and/or examples described herein comprise and/or use a processor. As used herein, the term "processor" signifies a tangible information processing device that physically transforms information, for example, data. As defined herein, "data" signifies information that can be in the form of an electrical, magnetic, or optical signal that is capable of being stored, accessed, transferred, combined, compared, or otherwise manipulated by an information processing device.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For information structured in binary form, any processor that can transform the information using the AND, OR and NOT logical operations (and their derivatives, such as the NAND, NOR, and XOR operations) can transform the information using any function of Boolean logic. A processor such as a neural network processor can also transform information non-digitally. There is no scientific evidence that any of these processors are processing, storing and retrieving information, in any manner or form equivalent to the bioelectric circuitry of the human brain.

As used herein, the term "module" signifies a tangible information processing device that typically is limited in size and/or complexity. For example, one or more methods or procedures in a computer program can be referred to as a module. A module can also refer to a small network of digital logic devices, in which the logic devices often may be interconnected to form a network. In many cases, methods and procedures in a computer program written in a specialized language, such as System C, can be used to generate a network of digital logic devices that process information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Altera), Random Access Memories (RAMS) or microprocessors. A module is configured to process information, typically using a sequence of operations to transform the information (or in the case of ROMs and RAMS, transforming information by using the input information as an address for memory that stores output information), to perform aspects of the present innovations, embodiments and/or examples of the invention.

Modules that are temporarily configured need not be configured at any one instance in time. For example, an information processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term "algorithm" signifies a sequence or set of operations or instructions that a module can use to transform information to achieve a result. A module can comprise one or more algorithms. As used herein, the term "computer" includes an information processor that can perform certain operations such as (but not limited to) the AND, OR and NOT logical operations, with the addition of memory (for example, memory based on flip-flops using the NOT-AND or NOT-OR operation). Such a digital computer is said to be Turing-complete or computationally universal. A computer, whether or not it is a digital computer, typically comprises many modules.

As used herein, the term "software" or "program" signifies one or more algorithms and data structures that configure an information processing device for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of instruction and data that configure the information processing device to achieve a specific result, for example, to perform word processing operations, or to encrypt a set of data.

As used herein, the term "programming language" signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from an information storage device. The computer typically has a device for reading storage media that is used to transport the software, or has an interface device that receives the software over a network.

Technology Specific General Computer Explanation

Figure 27B:
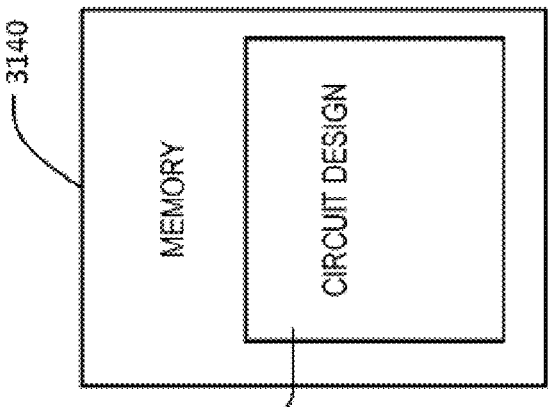
FIGS. 27A, 27B and 27C are simplified block diagrams of a computer system suitable for use with embodiments of the technology, as well as circuit design and circuit embodiments of the technology.
Figure 27C:
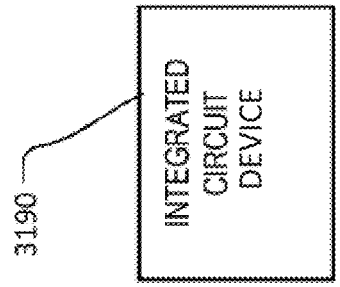
Figure 27A:
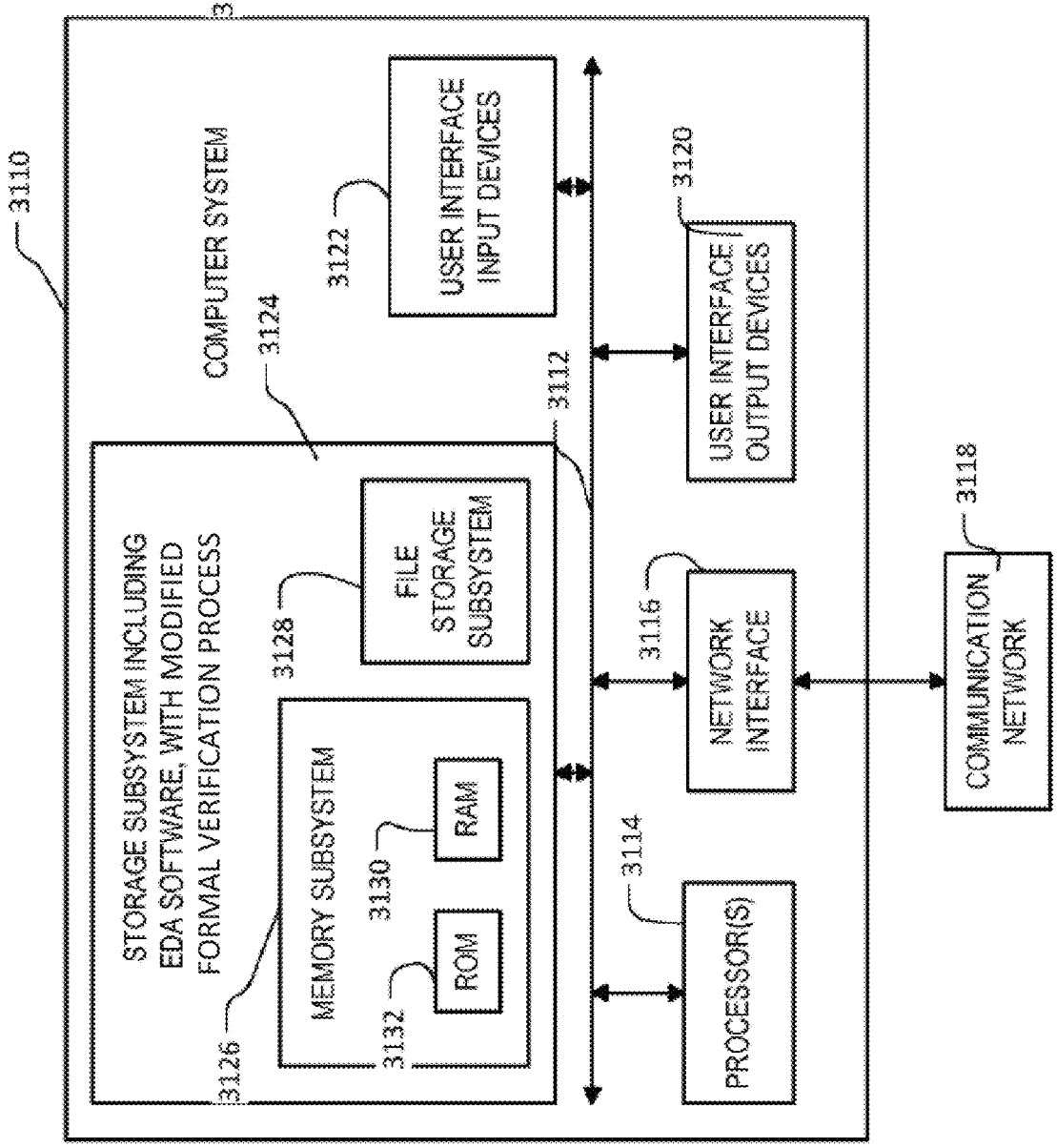

FIGS. 27A, 27B and 27C are simplified block diagrams of a computer system suitable for generating and verifying circuit designs using the multi-dimensional constraint solver of the present invention. Computer system 3110 typically includes at least one computer or processor 3114 which communicates with a number of peripheral devices via bus subsystem 3112. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a television, a network router, switch or bridge, or any data processing machine capable of executing instructions (sequential or otherwise) that specify actions to be taken by that machine. Innovations, embodiments and/or examples of the claimed inventions are neither limited to conventional computer applications nor the programmable apparatus that run them. To illustrate, the innovations, embodiments and/or examples of the claimed inventions can include an optical computer, quantum computer, analog computer, or the like. Aspects of the present invention are well suited to multi-processor or multi-core systems and may use or be implemented in distributed or remote systems. Processor here is used in the broadest sense to include singular processors and multi-core or multi-processor arrays, including graphic processing units, digital signal processors, digital processors and combinations of these elements. Further, while only a single computer system or a single machine may be illustrated, the use of a singular form of such terms shall also signify any collection of computer systems or machines that individually or jointly execute instructions to perform any one or more of the sets of instructions discussed herein. Due to the ever-changing nature of computers and networks, the description of computer system 3110 depicted in FIG. 27A is intended only as a specific example for purposes of illustrating the preferred embodiments. Many other configurations of computer system 3110 are possible having more or less components than the computer system depicted in FIG. 27A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example the Internet.

User interface input devices 3122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 3110 or onto communication network 3118. User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide nonvisual display such as via audio output devices. In general, use of the term "output device" is intended to include all possible types of devices and ways to output information from computer system 3110 to the user or to another machine or computer system.

Memory subsystem 3126 typically includes a number of memories including a main random access memory (RAM) 3130 for storage of instructions and data during program execution and a read only memory (ROM) 3132 in which fixed instructions are stored. In one embodiment, RAM 3130 also serves to store test vector value and other data utilized during execution of the multi-dimensional constraint solver described herein. File storage subsystem 3128 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 3128. Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses.

When configured to execute an EDA software tool including the multi-dimensional constraint solver described herein, computer system 3110 depicted in FIG. 27A represents an electronic structure suitable for creating a circuit design. FIG. 27B shows a memory 3140 such as a non-transitory, computer readable data storage medium associated with file storage subsystem 3128, and/or with network interface subsystem 3116, and includes a data structure 3180 specifying a circuit design describing an integrated circuit. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light). FIG. 27C is a block representing an IC 3190 designed and fabricated in accordance with the processes described above, where circuit 3190 is fabricated in accordance with the circuit design of data structure 3180 (see FIG. 27B).

The foregoing Detailed Description signifies in isolation individual features, structures or characteristics described herein and any combination of two or more such features, structures or characteristics, to the extent that such features, structures or characteristics or combinations thereof are based on the present specification as a whole in light of the knowledge of a person skilled in the art, irrespective of whether such features, structures or characteristics, or combinations thereof, solve any problems disclosed herein, and without limitation to the scope of the claims. When an embodiment of a claimed invention comprises a particular feature, structure, or characteristic, it is within the knowledge of a person skilled in the art to use such feature, structure, or characteristic in connection with other embodiments whether or not explicitly described.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims. Although the multi-dimensional constraint solver and associated method of the present invention is described above with specific reference to EDA tools utilized in the development of IC devices, the multi-dimensional constraint solver and associated method may be utilized in other fields as well, such as in software tools utilized to develop software programs and other systems.

The invention claimed is:

1. In an electronic design automation (EDA) tool in a computer, a multi-dimensional constraint solver configured to automatically generate a plurality of stimulus streams such that each said stimulus stream includes a plurality of test vector values that comply with multi-dimensional constraints including at least one first-dimension constraint and at one least second-dimensional constraint, said constraint solver including instructions that, when executed by a processor of said computer, cause the processor to perform a method comprising:
- establishing an array including a plurality of elements cooperatively interrelated in a plurality of rows and a plurality of columns such that each said element includes an associated test vector value;
- changing one or more of said test vector values until said array complies with all of said one or more first-dimension constraints;
- identifying a current element of said plurality of elements having a greatest impact on non-compliance of said array to said at least one second-dimension constraint, and revising the test vector value of said current element such that said revised test vector value reduces an amount of said non-compliance of said array to said one or more second-dimension constraints while maintaining compliance of said array with said at least one first-dimension constraint; and
- repeating said identifying and revising until said array complies with all of said multi-dimensional constraints.

2. The EDA tool of claim 1, wherein establishing said array comprises utilizing at least one of global variable values and said multi-dimensional constraints to determine a first number of said elements in each said row and a second number of said elements in each said column.

3. The EDA tool of claim 2,
- wherein establishing said array further comprises utilizing at least one of said global variable values and said multi-dimensional constraints to determine a set of valid test vector values for each of said plurality of elements, and
- wherein said method further comprises assigning initial element values to said plurality of elements such that each said element includes an associated said initial element value that is randomly selected from said set of valid test vector values determined for said each element.

4. The EDA tool of claim 3, wherein when said plurality of multi-dimensional constraints require one or more specified elements of said plurality of elements to store a corresponding fixed test vector value, said set of valid test vector values determined for each of said one or more specified elements includes only said corresponding fixed text vector value, whereby said initial element value randomly selected and assigned to each of said one or more specified elements is limited to said corresponding fixed test vector value.

5. The EDA tool of claim 1,
- wherein said at least one first-dimension constraint comprises one or more row constraints defining at least one valid row-sum value, and
- wherein said changing said one or more test vector values until said array complies with all of said one or more row constraints comprises:
  - selecting a non-compliant row of said plurality of rows in said array, said selected non-compliant row including a row-group of said elements and having an associated row-sum value determined by a sum of said associated test vector values of the elements included in said row-group, said associated row-sum value being non-compliant by differing from said at least one valid row-sum value;
  - randomly selecting an element from said group of said elements included in said selected non-compliant row; and
  - revising said associated test vector value of said selected element such that said revised associated test vector value is both selected from said set of valid test vector values generated for said selected element, and also reduces a difference between said associated row-sum value and said at least one valid row-sum value.

6. The EDA tool of claim 5,
- wherein said one or more row constraints comprise a plurality of row constraints that define a valid row-sum range including a series of row-sum values, and
- wherein revising said associated test vector value of said selected element comprises increasing said associated test vector value when said associated row-sum value is less than a minimum value of said valid row-sum range, and decreasing said associated test vector value when said associated row-sum value is greater than a maximum value of said valid row-sum range.

7. The EDA tool of claim 6,
- wherein said increasing and said decreasing comprises incrementally changing said associated test vector value, and
- wherein said changing said one or more test vector values comprises repeating said randomly selecting and said revising until said associated row-sum value of said selected non-compliant row is compliant with said valid row-sum range.

8. The EDA tool of claim 1, wherein said identifying said current element comprises:
- calculating an associated non-compliance amount for each element of said plurality of elements; and
- selecting said current element based on a comparison of said calculated non-compliance amounts.

9. The EDA tool of claim 8,
- wherein said at least one second-dimension constraint comprises one or more column constraints defining at least one valid column-sum value, and
- wherein calculating said associated non-compliance amount for each element comprises generating a calculated column-sum value by adding said test vector values of all of said elements disposed in an associated column including said each element, and calculating a first difference between said calculated column-sum value and said at least one valid column-sum value.

10. The EDA tool of claim 9,
- wherein said at least one second-dimension constraint further comprises one or more diagonal constraints defining at least one valid diagonal-sum value, and
- wherein calculating said associated non-compliance amount for each element further comprises generating a calculated diagonal-sum value by adding said test vector values of all of said elements disposed in associated diagonal series that intersect said each element, calculating a second difference between said calculated diagonal-sum value and said at least one valid diagonal-sum value, and then adding said first difference and said second difference.

11. The EDA tool of claim 8, selecting said current element further comprises, when two or more of said elements have common associated non-compliance amount values, randomly selecting one of said two or more elements as said current element.

12. The EDA tool of claim 1,
- wherein said at least one first-dimension constraint includes at least one row constraint, and
- wherein said revising the test vector value of said current element comprises:
  - determining a minimum change amount by which the associated test vector value of said current element must be changed to achieve compliance with said at least one second-dimension constraint;

calculating post-revision non-compliance values for a plurality of associated same-row elements, said same-row elements being disposed in the row containing the current element, such that each said post-revision conflicts value is proportional to a relative change in said amount of non-compliance of said array to said at least one second-dimension constraint if said associated same-row element were changed by a second amount that is opposite to said minimum change amount;

selecting one of said same-row elements having an associated said post-revision non-compliance value indicating a greatest reduction in said amount of non-compliance of said array to said at least one second-dimension constraint.

13. The EDA tool of claim 12, wherein said revising further comprises swapping the associated test vector value of said current element with a second said test vector value stored in said selected same-row element.

14. The EDA tool of claim 12, wherein said revising further comprises changing said associated test vector value of said current element by said minimum change amount and changing a second said test vector value stored in said selected same-row element by said second amount.

15. The EDA tool of claim 1,
wherein said at least one first-dimension constraint includes at least one row constraint defining at least one valid row-sum value, and
wherein said identifying and said revising comprises:
determining a minimum change amount by which said associated test vector value of said current element must be changed to achieve compliance with said one or more second-dimension constraints;
calculating a row-slack value by determining a difference between said at least one valid row-sum value and a row-sum value generated by adding the test vector values of all said element in the row containing the current element; and
changing said associated test vector value of said current element by an amount equal to the lesser of the minimum change amount and the calculated row-slack value.

16. The EDA tool of claim 1,
wherein said one or more row constraints defining a plurality of valid row-sum values,
wherein said at least one second-dimension constraint comprises one or more column constraints defining a plurality of valid column-sum values and one or more diagonal constraints defining a plurality of valid diagonal-sum values,
wherein said changing said test vector values comprises randomly selecting one or more elements from each non-compliant row of said plurality of rows, and revising said associated test vector values of said selected one or more elements until a sum of said elements in each said row is equal to one of said plurality of valid row-sum values, and
wherein said identifying and said repeating comprises calculating an associated non-compliance amount for each element of said plurality of elements, and selecting said current element based on a comparison of said calculated non-compliance amounts, wherein calculating said associated non-compliance amount for each element comprises:

generating a calculated column-sum value by adding said test vector values of all of said elements disposed in an associated column including said each element, and calculating a first difference between said calculated column-sum value and said at least one valid column-sum value, generating a calculated diagonal-sum value by adding said test vector values of all of said elements disposed in associated diagonal series including said each element, and calculating a second difference between said calculated diagonal-sum value and said at least one valid diagonal-sum value, and adding said first difference and said second difference.

17. The EDA tool of claim 1,
wherein said at least one second-dimension constraint comprises one or more column constraints and one or more diagonal constraints, and
wherein said identifying and said repeating comprises:
performing a first sub-phase including identifying and revising first said current elements based solely on non-compliance of said first current elements with said one or more column constraints, and repeating said identifying and revising said first current elements until all of said columns of said array comply with said one or more column constraints, and
performing a second sub-phase including identifying and revising second said current elements based on non-compliance of said second current elements with both said one or more column constraints and said one or more diagonal constraints, and repeating said identifying and revising said second current elements until said array complies with said one or more column constraints and said one or more diagonal constraints.

18. The EDA tool of claim 1, further comprising, when repeating said identifying and revising, scrambling randomly selected elements within one or more selected rows of said array when a local minima is detected.

19. A computer implemented method for automatically generating a plurality of a plurality of stimulus streams such that each said stimulus stream includes a plurality of test vector values that comply with multi-dimensional constraints including at least one first-dimension constraint and at least one second-dimensional constraint, said method comprising:
establishing an array including a plurality of elements cooperatively interrelated in a plurality of rows and a plurality of columns such that each said element includes an associated test vector value;
changing one or more of said test vector values until said array complies with all of said one or more first-dimension constraints;
identifying a current element of said plurality of elements having a greatest impact on non-compliance of said array to said at least one second-dimension constraint, and revising the test vector value of said current element such that said revised test vector value reduces an amount of said non-compliance of said array to said one or more second-dimension constraints while maintaining compliance of said array with said at least one first-dimension constraint; and
repeating said identifying and revising until said array complies with all of said multi-dimensional constraints.

20. An apparatus, comprising: a processor; and a non-transitory computer-readable storage medium storing instructions that, when executed by the processor, cause the processor to perform a method for automatically generating a plurality of a plurality of stimulus streams such that each said stimulus stream includes a plurality of test vector values that comply with multi-dimensional constraints including at least one first-dimension constraint and at least one second-dimensional constraint, said method comprising:
- establishing an array including a plurality of elements cooperatively interrelated in a plurality of rows and a plurality of columns such that each said element includes an associated test vector value;
- changing one or more of said test vector values until said array complies with all of said one or more first-dimension constraints;
- identifying a current element of said plurality of elements having a greatest impact on non-compliance of said array to said at least one second-dimension constraint, and revising the test vector value of said current element such that said revised test vector value reduces an amount of said non-compliance of said array to said one or more second-dimension constraints while maintaining compliance of said array with said at least one first-dimension constraint; and
- repeating said identifying and revising until said array complies with all of said multi-dimensional constraints.

* * * * *